United States Patent
Suzuki et al.

(10) Patent No.: US 9,882,334 B2
(45) Date of Patent: Jan. 30, 2018

(54) MIRROR DEVICE

(71) Applicant: Gigaphoton Inc., Tochigi (JP)

(72) Inventors: Toru Suzuki, Oyama (JP); Yukio Watanabe, Oyama (JP); Miwa Igarashi, Oyama (JP); Osamu Wakabayashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 15/201,769

(22) Filed: Jul. 5, 2016

(65) Prior Publication Data

US 2016/0315439 A1    Oct. 27, 2016

Related U.S. Application Data

(63) Continuation of application No. PCT/JP2014/059436, filed on Mar. 31, 2014.

(51) Int. Cl.
| | |
|---|---|
| *H01S 3/00* | (2006.01) |
| *G02B 7/182* | (2006.01) |
| *H05G 2/00* | (2006.01) |
| *H01S 3/10* | (2006.01) |
| *G02B 7/18* | (2006.01) |
| *G02B 27/14* | (2006.01) |
| *G02B 26/06* | (2006.01) |
| *H01S 3/223* | (2006.01) |
| *H01S 3/23* | (2006.01) |

(52) U.S. Cl.
CPC ............ *H01S 3/0071* (2013.01); *G02B 7/182* (2013.01); *G02B 7/1815* (2013.01); *G02B 27/144* (2013.01); *H01S 3/1003* (2013.01); *H05G 2/008* (2013.01); *G02B 26/06* (2013.01); *H01S 3/005* (2013.01); *H01S 3/2232* (2013.01); *H01S 3/2316* (2013.01); *H05G 2/003* (2013.01)

(58) Field of Classification Search
USPC ............................... 250/504 R; 359/819, 872
See application file for complete search history.

(56) References Cited

U.S. PATENT DOCUMENTS

| | | | |
|---|---|---|---|
| 7,589,921 B2 * | 9/2009 | Kwan ................... | G02B 7/005 |
| | | | 359/822 |
| 9,301,379 B2 * | 3/2016 | Watanabe ............. | H05G 2/008 |
| (Continued) | | | |

FOREIGN PATENT DOCUMENTS

| | | |
|---|---|---|
| JP | H07-020571 U | 4/1995 |
| JP | H08-257782 A | 10/1996 |
| (Continued) | | |

OTHER PUBLICATIONS

International Search Report issued in PCT/JP2014/059436; dated May 13, 2014.

(Continued)

*Primary Examiner* — Kiet T Nguyen
(74) *Attorney, Agent, or Firm* — Studebaker & Brackett PC

(57) ABSTRACT

A mirror device may include: an optical element configured to reflect part of a laser beam and transmit the other part of the laser beam therethrough; and a holder in surface contact with the optical element to hold the optical element. A flatness of a contact surface of the holder in contact with the optical element may be equal to or smaller than a flatness of the optical element.

9 Claims, 14 Drawing Sheets

(56) References Cited

U.S. PATENT DOCUMENTS

| | | | |
|---|---|---|---|
| 2003/0162484 A1* | 8/2003 | Oshino | G02B 7/00 451/42 |
| 2009/0103063 A1 | 4/2009 | Nishikawa | |
| 2009/0180503 A1 | 7/2009 | Funaoka et al. | |
| 2013/0020499 A1 | 1/2013 | Kameda et al. | |
| 2013/0134330 A1 | 5/2013 | Fujimoto et al. | |

FOREIGN PATENT DOCUMENTS

| | | |
|---|---|---|
| JP | 2009-170443 A | 7/2009 |
| JP | 2012-069907 A | 4/2012 |
| JP | 2013-004892 A | 1/2013 |
| JP | 2013-115176 A | 6/2013 |
| WO | 2009/051199 A1 | 4/2009 |

OTHER PUBLICATIONS

Written Opinion issued in PCT/JP2014/059436; dated May 13, 2014.

An Office Action; "Notice of Reasons for Rejection," mailed by the Japanese Patent Office dated Sep. 19, 2017, which corresponds to Japanese Patent Application No. 2016-511180 and is related to U.S. Appl. No. 15/201,769.

* cited by examiner

MIRROR DEVICE

CROSS-REFERENCES TO RELATED APPLICATIONS

This application claims the benefit of International Patent Application No. PCT/JP2014/059436 filed Mar. 31, 2014, which is incorporated herein by reference.

BACKGROUND

1. Technical Field

The present disclosure relates to a mirror device.

In recent years, as semiconductor processes become finer, transfer patterns for use photolithographies of semiconductor processes have rapidly become finer. In the next generation, microfabrication at 70 nm to 45 nm, further, microfabrication at 32 nm or less would be demanded. In order to meet the demand for microfabrication at 32 nm or less, for example, it is expected to develop an exposure device in which a system for generating extreme ultraviolet (EUV) light at a wavelength of approximately 13 nm is combined with a reduced projection reflective optical system.

Three types of EUV light generation systems have been proposed, which include an LPP (laser produced plasma) type system using plasma generated by irradiating a target material with a laser beam, a DPP (discharge produced plasma) type system using plasma generated by electric discharge, and an SR (synchrotron radiation) type system using synchrotron orbital radiation.

CITATION LIST

Patent Literature

PTL1: Japanese Patent Application Laid-Open No. 2012-69907
PTL2: Japanese Patent Application Laid-Open No. 2013-115176

SUMMARY

According to an aspect of the present disclosure, a mirror device may include: an optical element configured to reflect part of a laser beam and transmit the other part of the laser beam therethrough; and a holder in surface contact with the optical element to hold the optical element. A flatness of a contact surface of the holder in contact with the optical element may be equal to or smaller than a flatness of the optical element.

According to an aspect of the present disclosure, a mirror device may include: an optical element configured to reflect part of a laser beam and transmit the other part of the laser beam therethrough; and a holder in surface contact with the optical element to hold the optical element. When a wavelength of the laser beam reflected from a surface of the optical element is $\lambda$, a flatness of a contact surface of the holder in contact with the optical element may be equal to or smaller than one-fifth of $\lambda$.

BRIEF DESCRIPTION OF THE DRAWINGS

Hereinafter, selected embodiments of the present disclosure will be described with reference to the accompanying drawings by way of example.

DESCRIPTION OF EXEMPLARY EMBODIMENTS

Figure 1:
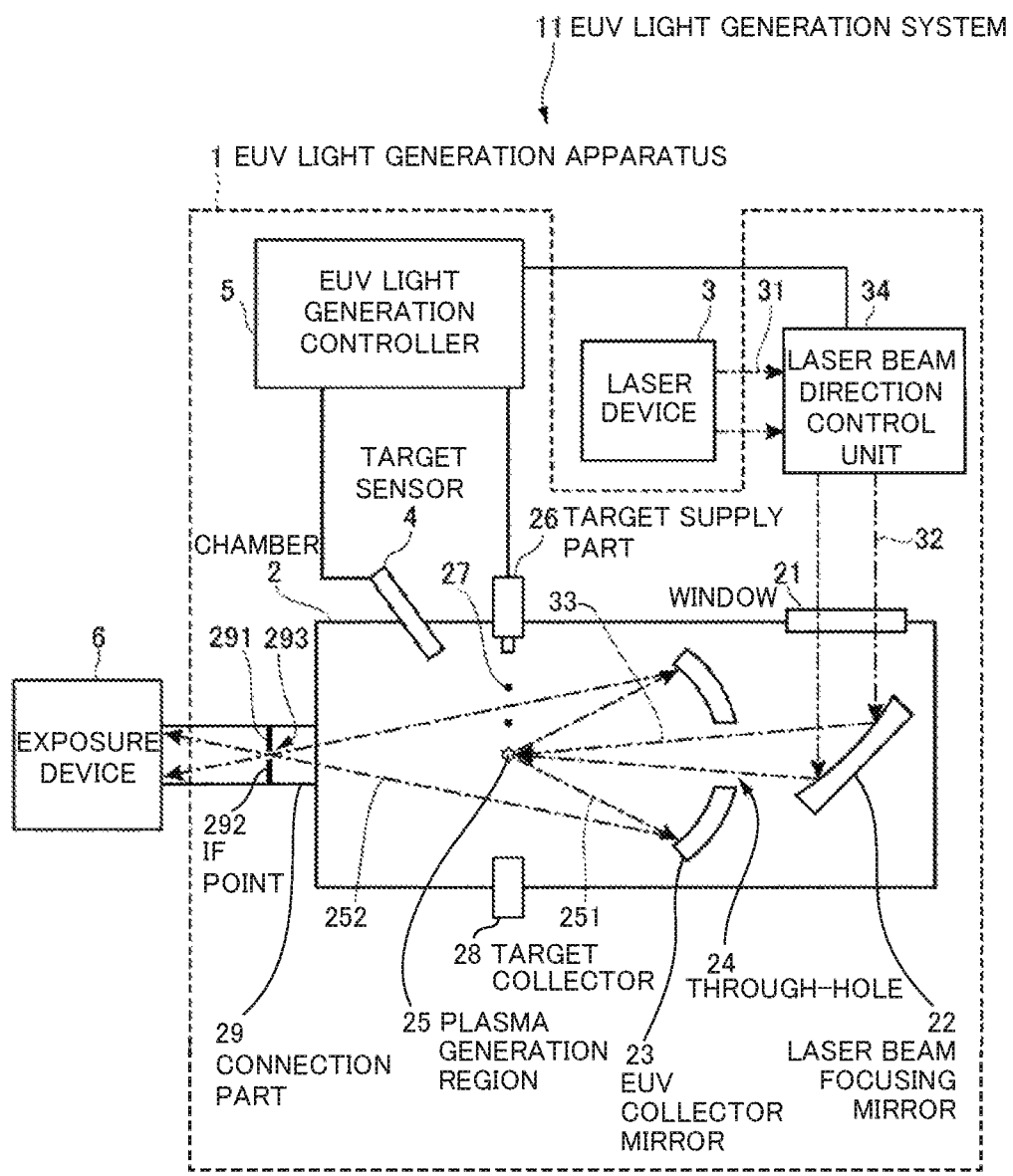
FIG. 1 schematically shows the configuration of an exemplary LPP type EUV light generation system.

<Contents>
1. Overview
2. Description of terms
3. Overview of the EUV light generation system
3.1 Configuration
3.2 Operation
4. Laser device including a laser oscillator and amplifiers
4.1 Configuration
4.2 Operation
4.3 Problem
5. Mirror device according to the present embodiment
5.1 First example of the mirror device
5.2 Second example of the mirror device
5.3 Third example of the mirror device
5.4 Fourth example of the mirror device
6. EUV light generation apparatus including the mirror device 6.1 Configuration
6.2 Operation
6.3 Effect
7. Others
7.1 Hardware environment of each controller
7.2 Wavefront adjustment unit
7.3 Modification Hereinafter, selected embodiments of the present disclosure will be described in detail with reference to the accompanying drawings. The embodiments to be described below are merely illustrative in nature and do not limit the scope of the present disclosure. Further, the configuration(s) and operation(s) described in each embodiment are not all essential in implementing the present disclosure. Corresponding elements may be referenced by corresponding reference numerals and characters, and therefore duplicate descriptions will be omitted.

1. Overview

The present disclosure may at least disclose the following embodiments.

A mirror device 35 may include an optical element 350 configured to reflect part of an entering laser beam and to transmit the other part of the laser beam therethrough, and a holder 351 in surface contact with the optical element 350 to hold the optical element 350. The flatness of a contact surface 352f of the holder 351 in contact with the optical element 350 may be equal to or smaller than the flatness of the optical element 350. With this configuration, the mirror device 35 can prevent the mismatch between the wavefront of the reflected light and the wavefront of the transmitted light.

2. Description of Terms

"Target" refers to a substance which is introduced into a chamber and is irradiated with a laser beam. The target irradiated with the laser beam is turned into plasma and emits EUV light. "Droplet" refers to one form of the target supplied into the chamber. "Axis of an optical path" refers to an axis passing through the center of the beam cross-section of a pulsed laser beam along the traveling direction of the pulsed laser beam. "Optical path" refers to a path through which the pulsed laser beam passes. The optical path may include the axis of the optical path. "Upstream side" of the optical path of the pulsed laser beam is the side near the laser oscillator. Meanwhile, "downstream side" of the optical path of the pulsed laser beam is the side far from the laser oscillator. "Flatness" means the magnitude of the difference from the geometrically correct plane (geometric plane) of a planar object (Japanese Industrial Standards JIS B 0621:1984). The flatness is defined by the minimum distance between two geometrically parallel planes when the planar object is sandwiched between the two planes (Japanese Industrial Standards JIS B 0621:1984). When the flatness is smaller, the planar object approximates to the geometric planer surface. That is, the smaller the flatness is, the better it is. The flatness can be one index of the surface accuracy.

3. Overview of the EUV Light Generation System
3.1 Configuration

FIG. 1 schematically shows the configuration of an exemplary LPP type EUV light generation system. An EUV light generation apparatus 1 may be used with at least one laser device 3. In the present disclosure, the system including the EUV light generation apparatus 1 and the laser device 3 may be referred to as an EUV light generation system 11. As shown in FIG. 1, and as described in detail later, the EUV light generation apparatus 1 may include a chamber 2 and a target supply part 26. The chamber 2 may be sealed airtight.

The target supply part 26 may be mounted onto the chamber 2, for example, to penetrate a wall of the chamber 2. A target material to be supplied from the target supply part 26 may include, but is not limited to, tin, terbium, gadolinium, lithium, xenon, or a combination of any two or more of them.

The chamber 2 may have at least one through-hole in its wall. A window 21 may be provided on the through-hole. A pulsed laser beam 32 outputted from the laser device 3 may transmit through the window 21. In the chamber 2, an EUV collector mirror 23 having a spheroidal reflective surface may be provided. The EUV collector mirror 23 may have a first focusing point and a second focusing point. The surface of the EUV collector mirror 23 may have a multi-layered reflective film in which molybdenum layers and silicon layers are alternately laminated. The EUV collector mirror 23 may be arranged such that the first focusing point is positioned in a plasma generation region 25 and the second focusing point is positioned in an intermediate focusing (IF) point 292. The EUV collector mirror 23 may have a through-hole 24 formed at the center thereof so that a pulsed laser beam 33 may pass through the through-hole 24.

The EUV light generation apparatus 1 may further include an EUV light generation controller 5 and a target sensor 4. The target sensor 4 may have an imaging function and detect the presence, trajectory, position, speed, and so forth of the target 27.

Further, the EUV light generation apparatus 1 may include a connection part 29 that allows the interior of the chamber 2 to be in communication with the interior of an exposure device 6. In the connection part 29, a wall 291 having an aperture 293 may be provided. The wall 291 may be positioned such that the second focusing point of the EUV collector mirror 23 lies in the aperture 293.

The EUV light generation apparatus 1 may also include a laser beam direction control unit 34, a laser beam focusing mirror 22, and the target collector 28 for collecting the target 27. The laser beam direction control unit 34 may include an optical element for defining the traveling direction of the laser beam and an actuator for adjusting the position, the posture and so forth of the optical element.

3.2 Operation

With reference to FIG. 1, a pulsed laser beam 31 outputted from the laser device 3 may pass through the laser beam direction control unit 34, transmit through the window 21 as a pulsed laser beam 32, and then enter the chamber 2. The pulsed laser beam 32 may travel through the chamber 2 along at least one laser beam path, be reflected from the laser beam focusing mirror 22, and be applied to at least one target 27 as the pulsed laser beam 33.

The target supply part 26 may be configured to output the target 27 to the plasma generation region 25 in the chamber 2. The target 27 may be irradiated with at least one pulse of the pulsed laser beam 33. Upon being irradiated with the pulsed laser beam, the target 27 may be turned into plasma, and EUV light 251 may be emitted from the plasma together with the emission of light at different wavelengths. The EUV light 251 may be selectively reflected from the EUV collector mirror 23. EUV light 252 reflected from the EUV collector mirror 23 may be focused onto the IF point 292, and outputted to the exposure device 6. Here, one target 27 may be irradiated with multiple pulses of the pulsed laser beam 33.

The EUV light generation controller 5 may be configured to totally control the EUV light generation system 11. The EUV light generation controller 5 may be configured to process the image data of the target 27 captured by the target sensor 4. Further, the EUV light generation controller 5 may be configured to control at least one of: the timing at which the target 27 is outputted; and the direction in which the target 27 is outputted. Furthermore, the EUV light generation controller 5 may be configured to control at least one of: the timing at which the laser device 3 oscillates; the traveling direction of the pulsed laser beam 32; and the position on which the pulsed laser beam 33 is focused. The various controls described above are merely examples, and other controls may be added as necessary.

4. Laser Device Including a Laser Oscillator and Amplifiers 4.1 Configuration

Figure 2:
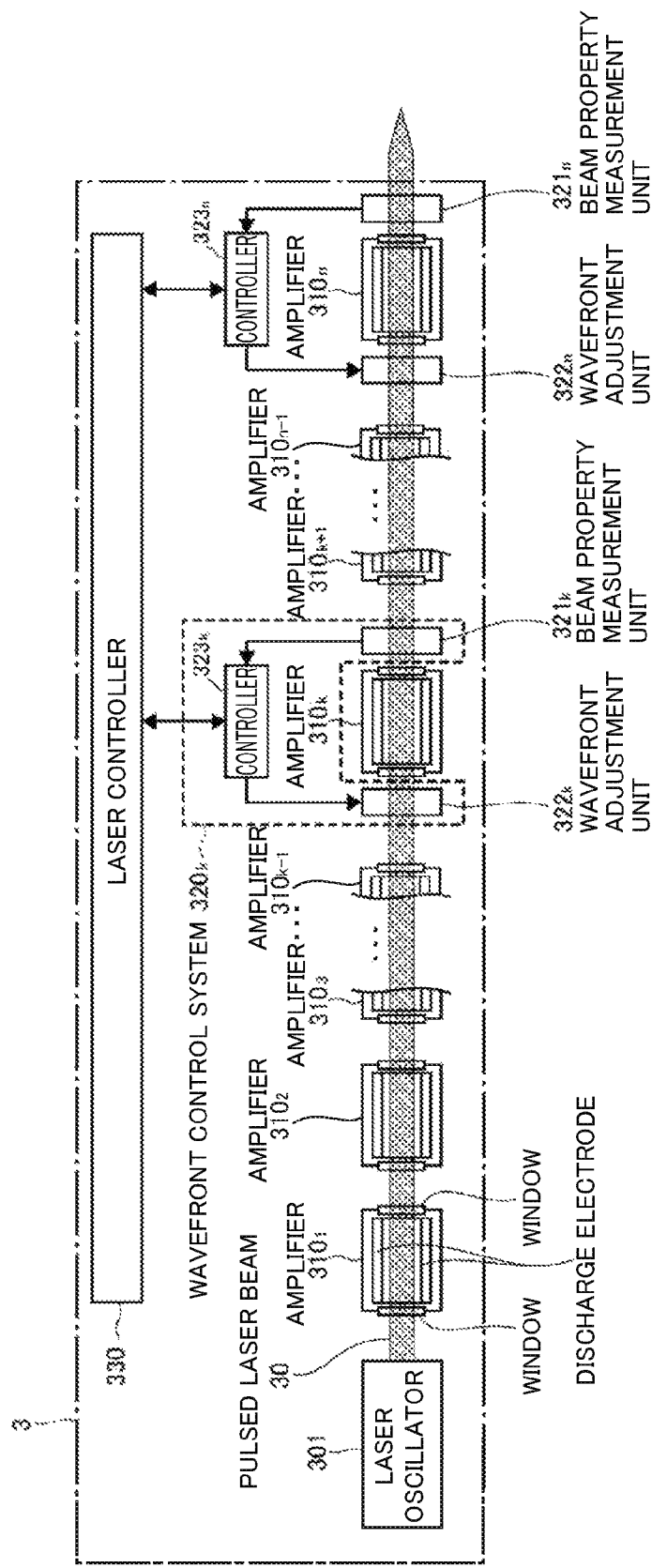
FIG. 2 is a drawing explaining the configuration of a laser device including a laser oscillator and amplifiers.

Now, with reference to FIGS. 2 and 3, the laser device 3 including a laser oscillator 301 and an amplifier 310 will be described. FIG. 2 is a drawing explaining the configuration of the laser device 3 including the laser oscillator 301 and the amplifier 310.

The laser device 3 of the EUV light generation system 11 may include the laser oscillator 301, the amplifier 310, a wavefront control system 320, and a laser controller 330. The laser oscillator 301 and the amplifier 310 may constitute an MOPA (master oscillator power amplifier) system. Here, the amplifier 310 may be constituted by one or more amplifiers $310_1$ to $310_n$. The one or more amplifiers $310_1$ to $310_n$ may be collectively referred to as "amplifier 310."

The laser oscillator 301 may be a master oscillator which constitutes the MOPA system. The laser oscillator 301 may be a gas laser. The laser oscillator 301 may be a gas laser that includes a pair of discharge electrodes, an optical resonator and a Q switch, and that uses $CO_2$ as laser gas. Alternatively, the laser oscillator 301 may be a semiconductor laser. The laser oscillator 301 may be a quantum-cascade laser that oscillates at a wavelength of the gain region of the $CO_2$ gas laser. The laser oscillator 301 may oscillate and emit a pulsed laser beam 30 to the subsequent amplifier 310. The pulsed laser beam 30 may include a seed beam, which is a laser beam having not been amplified by the amplifier 310. The wavelength of the pulsed laser beam 30 may be, for example, about 9 μm to 10.6 μm.

The amplifier 310 may be a power amplifier constituting the MOPA system. The amplifier 310 may be a gas laser. The amplifier 310 may be a gas laser that includes a pair of discharge electrodes and uses $CO_2$ as laser gas. A discharge voltage may be applied to the pair of discharge electrodes of the amplifier 310, from a high-frequency power source (not shown). The amplifier 310 may be a triaxial orthogonal amplifier, or a fast-axial-flow amplifier. Otherwise, the amplifier 310 may be a slab amplifier. The amplifier 310 may be disposed on the optical path of the pulsed laser beam 30 emitted from the laser oscillator 301.

As described above, the amplifier 310 may be constituted by one or more amplifiers $310_1$ to $310_n$. The amplifiers $310_1$ to $310_n$ may be arranged in series on the optical path of the pulsed laser beam 30 emitted from the laser oscillator 301. The amplifiers $310_1$ to $310_n$ may receive the pulsed laser beams emitted from the preceding laser oscillator 301 or amplifiers $310_1$ to $310_{n-1}$, respectively. The amplifiers $310_1$ to $310_{n-1}$ may amplify the received pulsed laser beams, and emit the amplified beams to the respective subsequent amplifiers $310_2$ to $310_n$. The last amplifier $310_n$ may amplify the received pulsed laser beam, and emit the amplified pulsed laser beam to the laser beam direction control unit 34 as the pulsed laser beam 31.

The wavefront control system 320 may be configured to control the wavefront of the pulsed laser beam 30 emitted from the amplifier 310. The wavefront control system 320 may include a beam property measurement unit 321, a wavefront adjustment unit 322, and a controller 323. Here, the wavefront control system 320 may be constituted by one or more wavefront control systems $320_1$ to $320_m$. The one or more wavefront control systems $320_1$ to $320_m$ may be collectively referred to as "wavefront control system 320." In addition, the wavefront control systems $320_1$ to $320_m$ may include the beam property measurement units $321_1$ to $321_m$, the wavefront adjustment units $322_1$ to $322_m$ and the controllers $323_1$ to $323_m$, respectively. The beam property measurement units $321_1$ to $321_m$ may be collectively referred to as "beam property measurement unit 321." The wavefront adjustment units $322_1$ to $322_m$ may be collectively referred to as "wavefront adjustment unit 322." The controllers $323_1$ to $323_m$ may be collectively referred to as "controller 323."

The beam property measurement unit 321 may be provided on the downstream side with respect to the amplifier 310, on the optical path of the pulsed laser beam 30 emitted from the laser oscillator 301. The beam property measurement unit 321 may measure various beam properties of the pulsed laser beam 30 emitted from the amplifier 310. The beam properties measured by the beam property measurement unit 321 may include beam divergence. The beam divergence may indicate the spread angle of a laser beam, which may be a parameter for the wavefront of the pulsed laser beam 30. The radius of curvature of the wavefront may be calculated from the beam divergence. The beam property measurement unit 321 may generate a measurement signal related to the measured beam property, and output the signal to the controller 323. The detailed configuration of the beam property measurement unit 321 will be described later with reference to FIG. 3.

The wavefront adjustment unit 322 may be provided on the upstream side with respect to the amplifier 310, on the optical path of the pulsed laser beam 30 emitted from the laser oscillator 301. The wavefront adjustment unit 322 may adjust the wavefront of the pulsed laser beam entering the amplifier 310. The wavefront adjustment unit 322 may include a concave lens, a convex lens, and a movable stage (not shown). The concave lens and the convex lens of the wavefront adjustment unit 322 may be placed on the movable stage to face one another. The concave lens and the convex lens placed on the movable stage may be located on the optical path of the pulsed laser beam 30. The movable stage may change the distance between the concave lens and the convex lens. The wavefront adjustment unit 322 may drive the movable stage to change the distance between the concave lens and the convex lens, according to a control signal from the controller 323.

The controller 323 may control the operations of the beam property measurement unit 321 and the wavefront adjustment unit 322 of the wavefront control system 320, based on a command from the laser controller 330. The controller 323 may receive, from the beam property measurement unit 321, the measurement signal related to the beam property of the pulsed laser beam 30 emitted from the amplifier 310. The controller 323 may output a control signal to control the wavefront of the pulsed laser beam 30 entering the amplifier 310, to the wavefront adjustment unit 322, based on the inputted measurement signal. The control signal may be a signal for changing the distance between the concave lens and the convex lens of the wavefront adjustment unit 322 to make the wavefront of the pulsed laser beam 30 entering the amplifier 310 have a desired radius of curvature. By this means, the wavefront of the pulsed laser beam 30 entering the amplifier 310 may be adjusted to a wavefront with a desired radius of curvature, according to the control of the controller 323. Here, a hardware configuration of the controller 323 will be described later with reference to FIG. 10.

As described above, the wavefront control system 320 may be constituted by one or more wavefront control systems $320_1$ to $320_m$. The wavefront control systems $320_1$ to $320_m$ may be provided to correspond to the amplifiers $310_1$ to $310_n$, respectively in one-to-one correspondence. Alternatively, the wavefront control systems $320_1$ to $320_m$ may be provided to correspond to part of the amplifiers $310_1$ to $310_n$, respectively. A specified amplifier 310 of the amplifiers $310_1$ to $310_n$ may be referred to as "amplifier $310_k$." A specified wavefront control system 320 of the wavefront control systems $320_1$ to $320_m$, which is provided for the amplifier $310_k$, may be referred to as "wavefront control system $320_k$." The beam property measurement unit 321, the wavefront adjustment unit 322, and the controller 323 which are included in the waveform control system $320_k$ may be referred to as "beam property measurement unit $321_k$", "wavefront adjustment unit $322_k$", and "controller $323_k$", respectively. That is, the wavefront adjustment unit $322_k$ may be provided on the upstream side with respect to the amplifier $310_k$ while the beam property measurement unit $321_k$ may be provided on the downstream side with respect to the amplifier $310_k$. The wavefront adjustment unit $322_k$ and the beam property measurement unit $321_k$ may be connected to the controller $323_k$.

The laser controller 330 may be connected to the EUV light generation controller 5 and send/receive various signals to/from the EUV light generation controller 5. For example, the laser controller 330 may receive a command signal related to the oscillation of the pulsed laser beam 30 from the EUV light generation controller 5. The command signal from the EUV light generation controller 5 may contain information for controlling the oscillation timing, the repetition frequency, the beam divergence, the optical path, the pulse energy and so forth of the pulsed laser beam 30. The laser controller 330 may totally control the operation of each of the components of the laser device 3, based on the command signal from the EUV light generation controller 5. The laser controller 330 may control the laser oscillation of the laser oscillator 301 and the laser amplification of the amplifier 310. The laser controller 330 may cause the controller 323 to control the wavefront control system 320. Here, the hardware configuration of the laser controller 330 will be described later with reference to FIG. 10.

Figure 3:
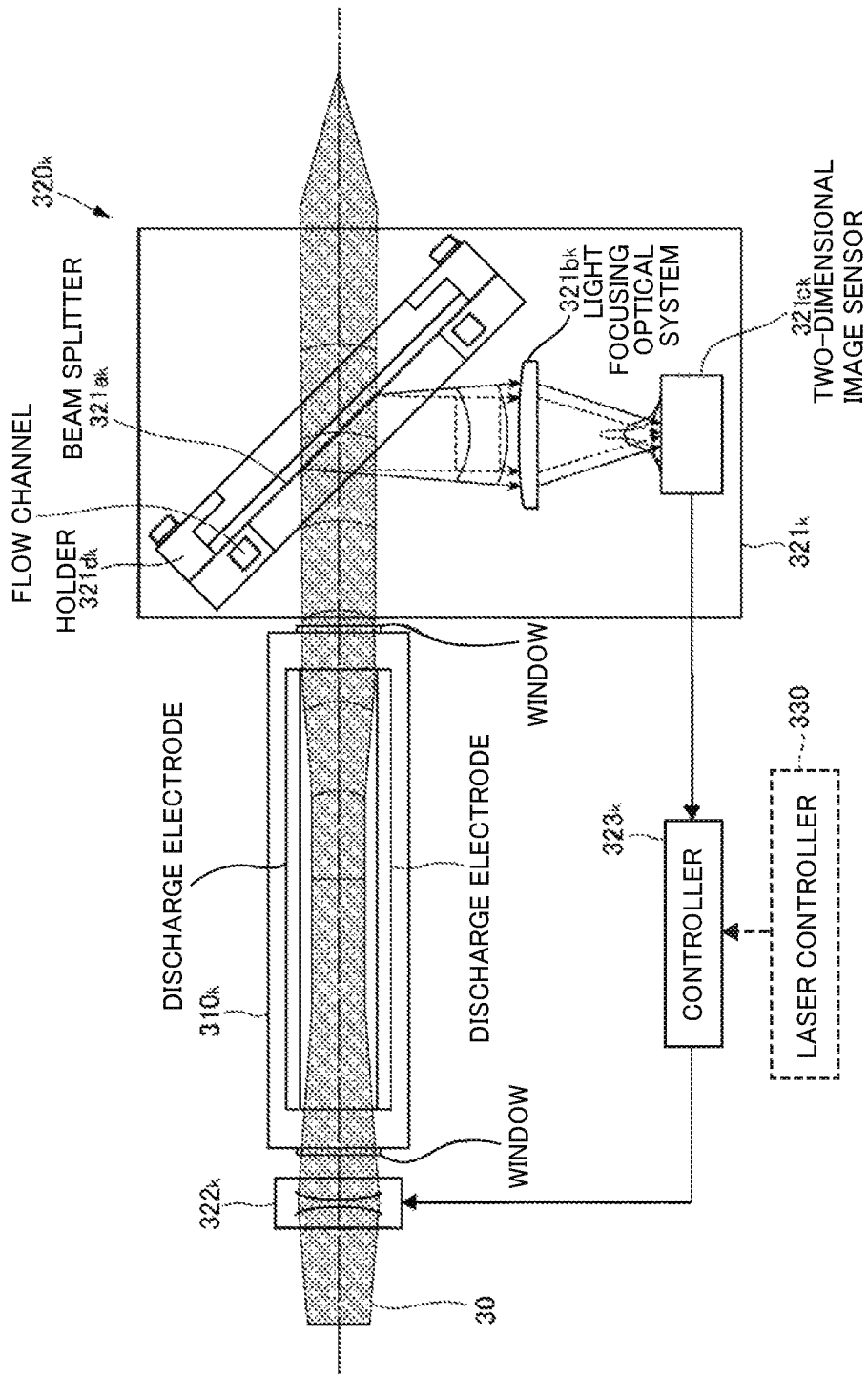
FIG. 3 is a drawing explaining the configuration of a beam property measurement unit of a wavefront control system.

FIG. 3 is a drawing explaining the configuration of the beam property measurement unit $321_k$ of the wavefront control system $320_k$. The beam property measurement unit $321_k$ may include a beam splitter $321a_k$, a light focusing optical system $321b_k$, a two-dimensional image sensor $321c_k$, and a holder $321d_k$.

The beam splitter $321a_k$ may reflect part of the entering pulsed laser beam 30 and transmit the other part of the pulsed laser beam 30 therethrough. The beam splitter $321a_k$ may be disposed at a predetermined position on the optical path of the pulsed laser beam 30 emitted from the laser oscillator 301. The beam splitter $321a_k$ may be disposed in a posture that allows the pulsed laser beam 30 having transmitted through the beam splitter $321a_k$ to travel on the optical path of the pulsed laser beam 30 emitted from the laser oscillator 301. At this time, the beam splitter $321a_k$ may be disposed in the posture that allows the pulsed laser beam 30 reflected from the beam splitter $321a_k$ to enter the light focusing optical system $321b_k$. The beam splitter $321a_k$ may divide the entering pulsed laser beam 30 into the pulsed laser beam 30 to be emitted to the subsequent wavefront control system $320_k$++ and the pulsed laser beam 30 to be emitted to the light focusing optical system $321b_k$.

The light focusing optical system $321b_k$ may focus the pulsed laser beam 30 reflected from the beam splitter $321a_k$ onto a light receiving surface of the two-dimensional image sensor $321c_k$.

The two-dimensional image sensor $321c_k$ may measure the various beam properties of the pulsed laser beam 30 focused by the light focusing optical system $321b_k$. The beam properties may include the beam divergence. The two-dimensional image sensor $321c_k$ may generate a measurement signal related to the measured beam properties, and output the signal to the controller 323.

The holder $321d_k$ may hold the beam splitter $321a_k$ to place the beam splitter $321a_k$ in the predetermined posture at the predetermined position. A flow channel through which a refrigerant flows may be provided inside the holder $321d_k$. The refrigerant may be cooling water. The holder $321d_k$ may cool the beam splitter $321a_k$ generating heat due to the absorption of the pulsed laser beam 30.

4.2 Operation

The laser controller 330 may control the high-frequency power source to apply a discharge voltage to the discharge electrodes of the amplifiers $310_1$ to $310_n$. Before the pulsed laser beam 30 from the laser oscillator 301 enters the amplifiers $310_1$ to $310_n$, discharges may be started in the amplifiers $310_1$ to $310_n$. The laser gas in the amplifiers $310_1$ to $310_n$ may be excited in advance.

The laser controller 330 may control the oscillation of the laser oscillator 301 to emit the pulsed laser beam 30 at a predetermined repetition frequency. The pulsed laser beam 30 emitted from the laser oscillator 301 may enter the first amplifier $310_1$ and be amplified by the amplifier $310_1$. The pulsed laser beam 30 amplified by the amplifier $310_1$ may enter the subsequent amplifier $310_2$ and be further amplified by the amplifier $310_2$. Subsequently, the amplification may be performed in the amplifiers $310_3$ to $310_n$ in the same way as the amplifier $310_1$ and the amplifier $310_2$. The pulsed laser beam 30 amplified by the last amplifier $310_n$ may be emitted to the laser beam direction control unit 34, as the pulsed laser beam 31.

Here, when the wavefront control system is provided in the amplifier 310, the pulsed laser beam 30 may be amplified as follows. The pulsed laser beam 30 emitted from the amplifier $310_{k-1}$ provided on the upstream side with respect to the amplifier $310_k$ may enter the wavefront adjustment unit $322_k$ of the wavefront control system $320_k$. The wavefront adjustment unit $322_k$ may adjust the wavefront of the entering pulsed laser beam 30 and emit the adjusted pulsed laser beam 30 to the amplifier $310_k$. The amplifier $310_k$ may amplify the pulsed laser beam 30 whose wavefront has been adjusted by the wavefront adjustment unit $322_k$.

Part of the pulsed laser beam 30 amplified by the amplifier $310_k$ may transmit through the beam splitter $321a_k$ of the beam property measurement unit $321_k$, and enter the amplifier $310_{k+1}$ or the wavefront adjustment unit $322_{k+1}$. The other part of the pulsed laser beam 30 amplified by the amplifier $310_k$ may be reflected from the beam splitter $321a_k$ of the beam property measurement unit $321_k$ and focused onto the two-dimensional image sensor $321c_k$. The two-dimensional image sensor $321c_k$ may measure the beam properties of the entering pulsed laser beam 30, and output a measurement signal related to the measured beam properties to the controller $323_k$. The controller $323_k$ may control the wavefront adjustment unit $322_k$ by feedback control to achieve desired beam properties, based on the inputted measurement signal.

4.3 Problem

As described above, the high-power pulsed laser beam 30 amplified by the amplifier $310_k$ may enter the beam splitter $321a_k$ of the beam property measurement unit $321_k$. Upon receiving the high-power pulsed laser beam 30, the beam splitter $321a_k$ may absorb part of the pulsed laser beam 30, and therefore generate heat. The beam splitter $321a_k$ generating heat may thermally expand. The beam splitter $321a_k$ may be tightened and cooled by the holder $321d_k$ through which the refrigerant flows. In this case, the thermal expansion and shrinkage of the beam splitter $321a_k$ may be restricted because the beam splitter $321a_k$ is tightened by the holder $321d_k$. Then, in the beam splitter $321a_k$, a thermal stress corresponding to the difference in the coefficient of thermal expansion between the beam splitter $321a_k$ and the holder $321d_k$ may be generated. By this means, the beam splitter $321a_k$ may not shrink as it was before the expansion, and then may be distorted. If the beam splitter $321a_k$ is distorted, the beam properties of the pulsed laser beam 30 reflected from the beam splitter $321a_k$ may be changed. In particular, the wavefront of the pulsed laser beam 30 may be easy to be changed from the wavefront obtained from the beam splitter $321a_k$ having not been distorted. Then, the wavefront of the pulsed laser beam 30 reflected from the beam splitter $321a_k$ may not match the wavefront of the pulsed laser beam 30 having transmitted through the beam splitter $321a_k$. Therefore, there has been a problem that it is not possible to achieve the desired beam properties of the pulsed laser beam 30 emitted from the amplifier $310_k$, even though the wavefront adjustment unit $322_k$ is controlled by feedback control based on the beam properties measured by the beam property measurement unit $321_k$. This problem may not be limited to the beam property measurement unit $321_k$ including the beam splitter $321a_k$ and the holder $321d_k$, but apply equally to a mirror device that includes an optical element configured to reflect part of a laser beam and to transmit the other of the laser beam therethrough, and a holder configured to hold the optical element. Therefore, there is a demand for a technology that can prevent the distortion of the optical element generating heat while being held by the holder.

5. Mirror Device According to the Present Embodiment

Now, with reference to FIGS. 4A to 8, the mirror device 35 according to the present embodiment will be described. In the mirror device 35 according to the present embodiment, the configurations of the optical element and the holder may be different from the configurations of the beam splitter $321a_k$ and the holder $321d_k$ shown in FIG. 3. In the mirror device 35 according to the present embodiment, the configurations which are the same as the configurations of the beam splitter $321a_k$ and the holder $321d_k$ shown in FIG. 3 will not be described again here. Examples of the mirror device 35 will be described as first to fourth examples.

5.1 First Example of the Mirror Device

Figure 4A:
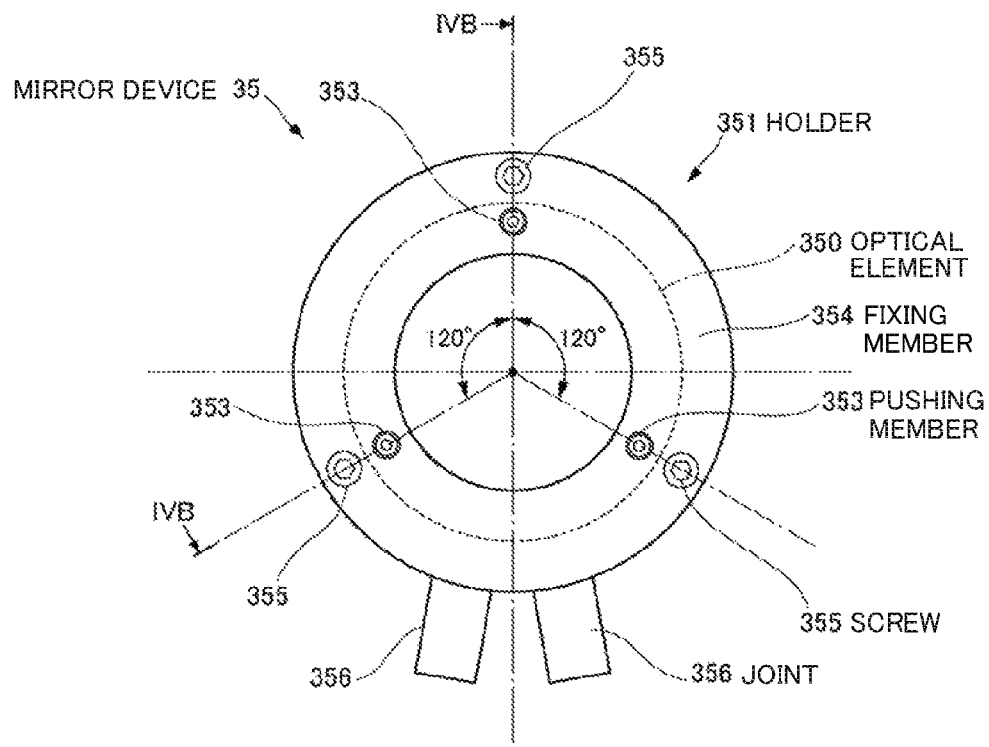
FIG. 4A is a drawing explaining a first example of the mirror device.
Figure 4B:
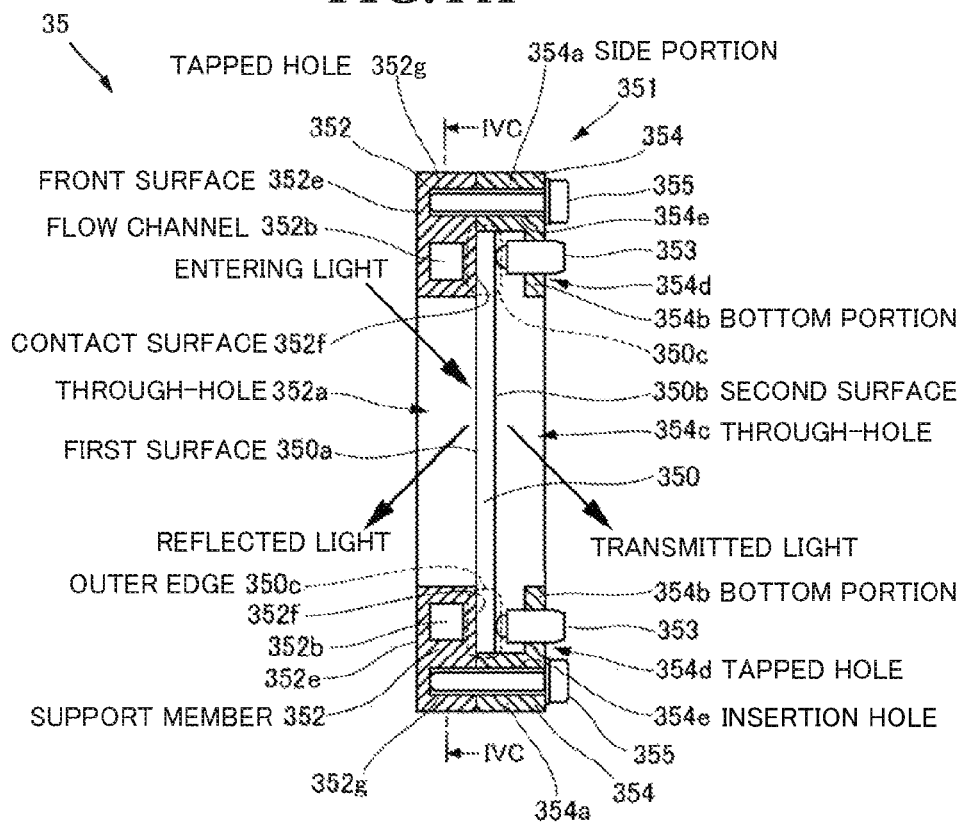
FIG. 4B is a cross-sectional view showing the mirror device taken along line IVB-IVB shown in FIG. 4A.
Figure 4:
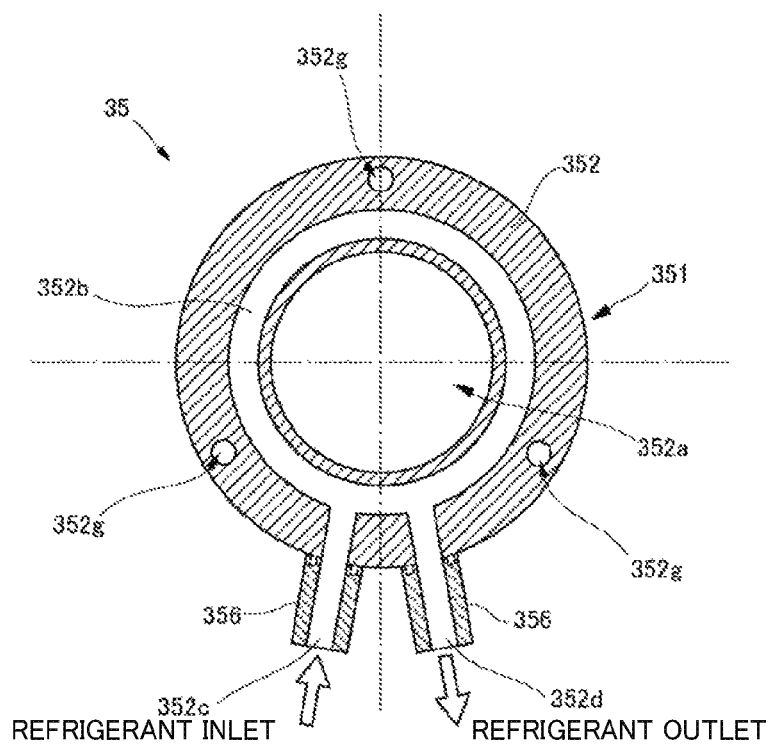
FIG. 4C is a cross-sectional view showing the mirror device taken along line IVC-IVC shown in FIG. 4B.
FIG. 4D is a drawing explaining the flatness of each of a support member and an optical element shown in FIG. 4B.
Figure 4:
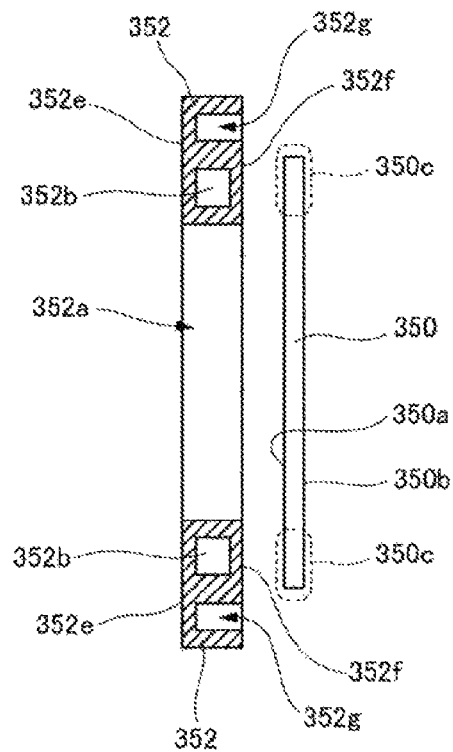

Now, with reference to FIGS. 4A to 4D, the first example of the mirror device 35 will be described. FIG. 4A is a drawing explaining the first example of the mirror device 35. FIG. 4B is a cross-sectional view showing the mirror device 35 taken along line IVB-IVB shown in FIG. 4A. FIG. 4C is a cross-sectional view showing the mirror device 35 taken along line IVC-IVC shown in FIG. 4B.

The first example of the mirror device 35 may include the optical element 350 and the holder 351.

The optical element 350 may be configured to reflect part of the entering pulsed laser beam 30 and transmit the other part of the pulsed laser beam 30 therethrough. The optical element 350 may be, for example, a beam splitter or a dichroic mirror. The optical element 350 may be formed as a circular plate. The optical element 350 may have a planer structure. The optical element 350 may be formed by using a diamond substrate. When the power of the pulsed laser beam 30 is low, the optical element 350 may be formed by using a GaAs substrate. However, when the power of the pulsed laser beam 30 is equal to or higher than several kW, the optical element 350 may be preferably formed by using a diamond substrate.

The optical element 350 may include at least a first surface 350a and a second surface 350b. The first surface 350a may be an entrance plane of the optical element 350 into which the pulsed laser beam 30 enters. A reflection coating to reflect part of the pulsed laser beam 30 may be applied to the first surface 350a. The second surface 350b may be the opposite surface of the first surface 350a. The second surface 350b may be an exit plane of the optical element 350 from which part of the pulsed laser beam 30 having transmitted through the optical element 350 exits. An antireflective coating to prevent the reflection of the pulsed laser beam 30 may be applied to the second surface 350b. Part of the pulsed laser beam 30 entering the optical element 350 may be reflected from the first surface 350a as reflected beam. The other part of the pulsed laser beam 30 entering the optical element 350 may transmit through the first surface 350a and the interior of the optical element 350, and exit the second surface 350b as transmitted beam.

The holder 351 may accommodate the optical element 350 and hold the optical element 350 therein. The holder 351 may be in surface contact with the optical element 350 to hold the optical element 350. The holder 351 may be formed into a hollow cylindrical shape. The holder 351 may include a support member 352, pushing members 353, a fixing member 354, screws 355, and joints 356. The support member 352 and the fixing member 354 may constitute the frame of the holder 351.

The support member 352 may be in surface contact with the optical element 350 to support the optical element 350. The support member 352 may be formed by using a metallic material or a ceramic material. The metallic material for forming the support member 352 may be stainless steel or copper, or contain copper. The ceramic material for forming the support member 352 may be SiC (silicon carbide). The support member 352 may include a through-hole 352a, a flow channel 352b, a refrigerant inlet 352c, a refrigerant outlet 352d, a front surface 352e, a contact surface 352f, and tapped holes 352g.

The support member 352 may be formed as a circular plate. The outside diameter of the support member 352 may be greater than the diameter of the optical element 350. The central axis of the support member 352 may match the central axis of the optical element 350 set in the support member 352. The through-hole 352a may be formed in the center of the support member 352. The through-hole 352a may be configured to guide the pulsed laser beam 30 entering the mirror device 35 to the optical element 350. The diameter of the through-hole 352a may be greater than the diameter of the pulsed laser beam 30 and smaller than the diameter of the optical element 350. The central axis of the through-hole 352a may match the central axis of the optical element 350 set in the support member 352.

The flow channel 352b through which a refrigerant flows may be formed inside of the support member 352 which is located radially outside of the through-hole 352a. The refrigerant may be cooling water. The position of the flow channel 352b in the support member 352 may correspond to the position of an outer edge 350c of the optical element 350 set in the support member 352. Here, the outer edge 350c of the optical element 350 set in the support member 352 may be located radially outside of the through-hole 352a.

The flow channel 352b may be provided with the refrigerant inlet 352c and the refrigerant outlet 352d. The refrigerant inlet 352c may be an inlet to flow the refrigerant into the flow channel 352b. The refrigerant outlet 352d may be an outlet to flow the refrigerant out of the flow channel 352b. The joints 356 may be mounted to the refrigerant inlet 352c and the refrigerant outlet 352d. The refrigerant inlet 352c and the refrigerant outlet 352d may be jointed to pipes (not shown) via the joints 356. The pipes may be connected to a pump (not shown). The flow channel 352b, the refrigerant inlet 352c, the refrigerant outlet 352d, the joints 356, the pipes, and the pump may communicate with each other. The refrigerant flowing through the flow channel 352b may circulate in the flow channel 352b by driving the pump.

The heat generated in the optical element 350 due to the absorption of the pulsed laser beam 30 may be transferred to the support member 352 in surface contact with the optical element 350 by heat conduction. The heat transferred to the support member 352 may be transferred to the refrigerant circulating in the flow channel 352b, and then discharged to the outside of the mirror device 35. By this means, the holder 351 may efficiently cool the optical element 350 generating heat due to the absorption of the pulsed laser beam 30 by the support member 352 in surface contact with the optical element 350 while the refrigerant flows through the support member 352.

The front surface 352e of the support member 352 may be one side of the support member 352 into which the pulsed laser beam 30 enters. The contact surface 352f of the support member 352 may be the other side of the support member 352, which is the opposite surface of the front surface 352e. The optical element 350 may be set on the contact surface 352f. The contact surface 352f may be in surface contact with the first surface 350a of the optical element 350. The contact surface 352f may be in surface contact with the first surface 350a of the optical element 350 at the outer edge 350c. The contact surface 352f may be polished to provide a high surface accuracy. The surface accuracy may be tested by using a Fizeau interferometer. The parameter indicating the surface accuracy of the contact surface 352f may be flatness. The flatness of each of the contact surface 352f and the first surface 350a will be described later with reference to FIG. 4D.

The tapped holes 352g may be formed in the contact surface 352f of the support member 352. The tapped holes 352g may be female threads corresponding to the screws 355 which are male screws. The tapped holes 352g may be formed radially outside of the part of the contact surface 352f supporting the optical element 350. The tapped holes 352g in the contact surface 352f may be located radially outside of the outer edge 350c of the optical element 350 set in the support member 352.

The pushing members 353 may push the optical element 350 against the support member 352. The pushing members 353 may push the second surface 350b of the optical element 350. The pushing members 353 may include an elastic body such as a spring. The pushing members 353 may be plunger screws. The exterior part of the plunger screw may be threaded so as to be formed as a male screw. The front end of the plunger screw may be formed as a hemispherical pin or ball in contact with the optical element 350. The elastic body such as a spring that applies a force to push out the pin or ball may be provided to be able to expand and shrink in the plunger screw.

The pushing members 353 may push the optical element 350 against the support member 352 by pushing the second surface 350b. At this time, the portions of the pushing members 353 in contact with the second surface 350b may slide on the second surface 350b. In addition, the portions of the pushing members 353 in contact with the second surface 350b may be expanded and shrunk by the elastic bodies of the pushing members 353 in the thickness direction of the optical element 350. Therefore, the pushing members 353 may push the optical element 350 against the support member 352 without restricting the optical element 350 from thermally expanding and shrinking. By this means, even though the optical element 350 generating heat due to the absorption of the pulsed laser beam 30 is thermally expanded and shrunk by the cooling, the holder 351 may hold the optical element 350 without distorting the optical element 350.

The pushing members 353 may push the second surface 350b of the optical element 350 at the outer edge 350c. The pushing members 353 may push the second surface 350b at at least three or more points of the outer edge 350c. The points of the second surface 350b pushed by the pushing members 353 may be symmetric with respect to the center of the optical element 350 set in the support member 352. When there are three points pushed by the pushing members 353, these points may be spaced from each other by 120 degrees along the circumferential direction of the through-hole 352a.

The pushing members 353 may push at least three or more points which are symmetric with respect to the center of the optical element 350. By pushing the optical element 350 by those pushing members 353, the force may be applied uniformly to the optical element 350. Therefore, the stress generated in the optical element 350 by pushing the optical element 350 by the pushing members 353 may not be easy to be concentrated on the specified positions of the optical element 350 pushed by the pushing members 353. By this means, even when the pushing members 353 push the optical element 350, the holder 351 may hold the optical element 350 without distorting the optical element 350. Here, leaf springs may be used as the pushing members 353, instead of the plunger screws. The leaf springs as the pushing members 353 may be in surface contact with the optical element 350 to push the optical element 350.

The fixing member 354 may fix the pushing members 353 pushing the optical element 350 against the support member 352. The fixing member 354 may be formed by using a metallic material or a ceramic material. The material for forming the fixing member 354 may be the same as the material for forming the support member 352. The fixing member 354 may include a side portion 354a, a bottom portion 354b, a through-hole 354c, tapped holes 354d, and insertion holes 354e.

The side portion 354a of the fixing member 354 may be formed into a hollow cylindrical shape. The inside diameter of the side portion 354a may be greater than the diameter of the optical element 350. The outside diameter of the side portion 354a may be similar to the outside diameter of the support member 352. The central axis of the side portion 354a may match the central axis of the optical element 350 set in the support member 352. One end of the side portion 354a may be closed by the bottom portion 354b, but the other end of the side portion 354a may not be closed by the bottom portion 354b. The surface of the other end of the side portion 354a may be in surface contact with the contact surface 352f of the support member 352 when the fixing member 354 is coupled with the support member 352.

The bottom portion 354b of the fixing member 354 may be a circular plate that closes the one end of the side portion 354a having a hollow cylindrical shape. The central axis of the bottom portion 354b may match the central axis of the optical element 350 set in the support member 352. The through-hole 354c may be formed in the center of the bottom portion 354b. The through-hole 354c may be configured to guide the pulsed laser beam 30 having transmitted through the optical element 350 to the outside of the mirror device 35. The diameter of the through-hole 354c may be greater than the diameter of the pulsed laser beam 30, and smaller than the diameter of the optical element 350. The central axis of the through-hole 354c may match the central axis of the optical element 350 set in the support member 352.

The tapped holes 354d may be formed in the bottom portion 354b located radially outside of the through-hole 354c. The tapped holes 354d may be female threads corresponding to the pushing members 353 which are plunger screws as male screws. The tapped holes 354d may penetrate the bottom portion 354b. The positions of the tapped holes 354d in the bottom portion 354b may correspond to the positions of the pushing members 353 pushing the optical element 350 set in the support member 352.

The insertion holes 354e may be formed in the bottom portion 354b. The insertion holes 354e may be configured to insert the screws 355 therein. The insertion holes 354e may penetrate the bottom portion 354b. The insertion holes 354e may penetrate the bottom portion 354b and the side portion 354a. The positions of the insertion holes 354e in the bottom portion 354b may correspond to the positions of the tapped holes 352g of the support member 352 when the fixing member 354 is coupled with the support member 352. Here, the insertion holes 354e may be female threads corresponding to the screws 355, like the tapped holes 352g.

The screws 355 may be members used to screw the fixing member 354 to the support member 352 after the fixing member 354 is coupled with the support member 352. The screws 355 may be inserted into the insertion holes 354e of the fixing member 354 and fitted into the tapped holes 352g of the support member 352.

With reference to FIG. 4D, the flatness of each of the support member 352 and the optical element 350 will be described. FIG. 4D is a drawing explaining the flatness of each of the support member 352 and the optical element 350 shown in FIG. 4B.

The flatness of the optical element 350 may be, for example, equal to or smaller than at least one-fifth of a wavelength λ of the pulsed laser beam 30 reflected from the optical element 350, as a PV (peak to valley) value. Preferably, the flatness of the optical element 350 may be equal to or smaller than one-tenth of the wavelength λ of the pulsed laser beam 30 reflected from the optical element 350, as a PV value. The flatness of the contact surface of the holder 351 in contact with the optical element 350 may be equal to or smaller than the flatness of the optical element 350. To be more specific, the flatness of the contact surface 352f of the support member 352 may be equal to or smaller than the flatness of the optical element 350. Further more specifically, the flatness of the contact surface 352f of the support member 352 may be equal to or smaller than the flatness of the first surface 350a of the optical element 350.

The flatness of the contact surface 352f of the support member 352 in surface contact with the optical element 350 may be equal to or better than the flatness of the optical element 350. Therefore, the optical element 350 generating heat while being pushed against the support member 352 may thermally expand and shrink without being subjected to a locally applied force caused by the surface roughness and the irregularity of the contact surface 352f. Moreover, the contact thermal resistance between the optical element 350 and the support member 352 may be reduced, and therefore the heat generated in the optical element 350 may be easy to be transferred to the support member 352. Accordingly, the temperature of the optical element 350 may not be easy to be increased, and therefore it is possible to reduce a change in the volume of the optical element 350 due to the thermal expansion. By this means, even though the optical element 350 generating heat due to the absorption of the pulsed laser beam 30 is thermally expanded and shrunk by the cooling, the holder 351 may hold the optical element 350 without distorting the optical element 350.

With the above-described configuration according to the first example, the holder 351 can hold the optical element 350 by uniformly applying a force to the optical element 350, without restricting the optical element 350 from thermally expanding and shrinking. In addition, according to the first example, the holder 351 can hold the optical element 350 thermally expanding and shrinking, without locally applying a force caused by the surface roughness and the irregularity of the contact surface 352f to the optical element 350. Moreover, according to the first example, the holder 351 can reduce a change in the volume of the optical element 350 due to the thermal expansion. By this means, the first example of the mirror device 35 can prevent the optical element 350 from being distorted when the optical element 350 held by the holder 351 generates heat. Therefore, the first example of the mirror device 35 can prevent the mismatch between the wavefront of the pulsed laser beam 30 reflected from the mirror device 35 and the wavefront of the pulsed laser beam 30 having transmitted through the mirror device 35.

In the first example of the mirror device 35, the other configurations may be the same as the configurations of the beam splitter $321a_k$ and the holder $321d_k$ shown in FIG. 3.

5.2 Second Example of the Mirror Device

Figure 5A:
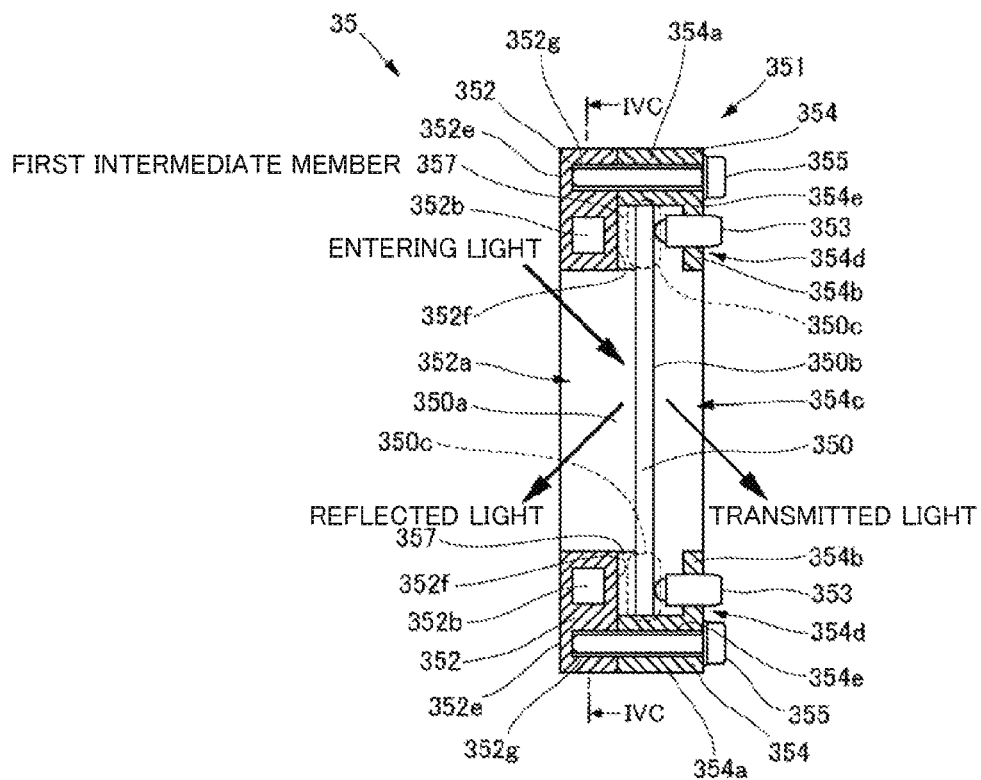
FIG. 5A is a drawing explaining a second example of the mirror device.
Figure 5B:
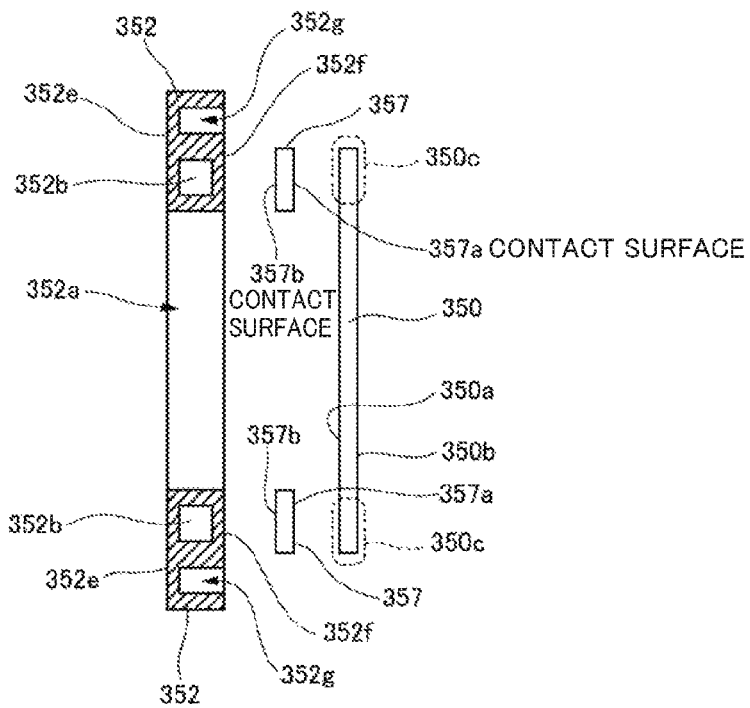
FIG. 5B is a drawing explaining the flatness of each of the support member, a first intermediate member, and the optical element shown in FIG. 5A.

Now, with reference to FIGS. 5A and 5B, the second example of the mirror device 35 will be described. FIG. 5A is a drawing explaining the second example of the mirror device 35. FIG. 5B is a drawing explaining the flatness of each of the support member 352, a first intermediate member 357, and the optical element 350 shown in FIG. 5A.

The second example of the mirror device 35 may have a configuration where the first intermediate member 357 is added to the first example of the mirror device 35. The configuration of the second example of the mirror device 35, which is the same as that of the first example of the mirror device 35 shown in FIGS. 4A to 4D, will not be described again here.

The first intermediate member 357 may be configured to adjust the surface accuracy of the support member 352 and the surface accuracy of the optical element 350. The first intermediate member 357 may be a plate-like ring provided between the support member 352 and the optical element 350. The inside diameter of the ring may be similar to the diameter of the through-hole 352a of the support member 352. The outside diameter of the ring may be similar to the diameter of the optical element 350. The first intermediate member 357 may be formed by using a metallic material or a ceramic material. The material for forming the first intermediate member 357 may be the same as the material for forming the support member 352.

The first intermediate member 357 may be in surface contact with the first surface 350a of the optical element 350. The flatness of a contact surface 357a of the first intermediate member 357 in contact with the optical element 350 may be equal to or smaller than the flatness of the optical element 350. The flatness of the contact surface 357a of the first intermediate member 357 may be equal to or smaller than the flatness of the first surface 350a of the optical element 350. That is, the flatness of the contact surface 357a of the first intermediate member 357 in surface contact with the optical element 350 may be equal to or better than the flatness of the optical element 350. By this means, the optical element 350 generating heat while being pushed against the support member 352 may thermally expand and shrink without being subjected to a locally applied force caused by the surface roughness and the irregularity of the contact surface 357a of the first intermediate member 357.

The first intermediate member 357 may be in surface contact with the contact surface 352f of the support member 352. The flatness of a contact surface 357b of the first intermediate member 357 in contact with the support member 352 may be equal to or smaller than the flatness of the optical element 350, in the same way as the contact surface 357a of the first intermediate member 357. The flatness of the contact surface 357b of the first intermediate member 357 may be equal to or smaller than the flatness of the first surface 350a of the optical element 350. That is, the flatness of the contact surface 357b of the first intermediate member 357 in surface contact with the support member 352 may be equal to or better than the flatness of the optical element 350.

If the flatness of the contact surface 357b of the first intermediate member 357 is not good, when the optical element 350 pushes the contact surface 357a by the pushing from the pushing members 353 or the thermal expansion, the contact surface 357a may be distorted according to the surface roughness and the irregularity of the contact surface 357b. Moreover, the contact thermal resistance between the first intermediate member 357 and the support member 352 may be increased, and therefore the heat may not be easy to be transferred from the first intermediate member 357 to the support member 352. Then, a change in the volume of the optical element 350 may be increased due to the thermal expansion. In contrast, if the flatness of the contact surface 357b of the first intermediate member 357 is equal to or better than the flatness of the optical element 350, the contact surface 357a may not be distorted according to the surface roughness and irregularity of the contact surface 357b. Moreover, the contact thermal resistance between the first intermediate member 357 and the support member 352 may be reduced, and therefore the heat may be easy to be transferred from the first intermediate member 357 to the support member 352. Therefore, it is possible to reduce a change in the volume of the optical element 350 due to the thermal expansion. That is, when the flatness of the contact surface 357b of the first intermediate member 357 is equal to or better than the flatness of the optical element 350, it is possible to prevent the optical element 350 from being distorted when the optical element 350 held by the holder 351 generates heat.

Here, according to the second example, a configuration of the holder 351 may be possible where the flatness of the contact surface 357b of the first intermediate member 357 is not equal to or better than the flatness of the optical element 350. In this case, a buffering member such as soft metal or metallic paste (not shown) may fill a space between the contact surface 352f of the support member 352 and the contact surface 357b of the first intermediate member 357. Examples of the soft metal may include indium, tin, silver, and copper. Examples of the metallic paste may include silver paste and copper paste. The buffering member may absorb the surface roughness and the irregularity of the contact surface 357b of the first intermediate member 357. By this means, the contact surface 357a of the first intermediate member 357 in contact with the optical element 350 may not be distorted according to the surface roughness and the irregularity of the contact surface 357b. Moreover, the contact thermal resistance between the first intermediate member 357 and the support member 352 is reduced, and therefore the heat may be easy to be transferred from the first intermediate member 357 to the support member 352. Therefore, it is possible to reduce a change in the volume of the optical element 350 due to the thermal expansion. Nevertheless, it is preferred that the flatness of the contact surface 357b of the first intermediate member 357 in contact with the support member 352 is equal to or better than the flatness of the optical element 350.

With the above-described configuration according to the second example, even though the optical element 350 generating heat due to the absorption of the pulsed laser beam 30 is thermally expanded and shrunk by the cooling, the holder 351 can hold the optical element 350 without distorting the optical element 350. Therefore, the second example of the mirror device 35 can prevent the optical element 350 from being distorted when the optical element 350 held by the holder 351 generates heat.

The other configuration of the second example of the mirror device 35 may be the same as the configuration of the first example of the mirror device 35 shown in FIGS. 4A to 4D.

5.3 Third Example of the Mirror Device

Figure 6A:
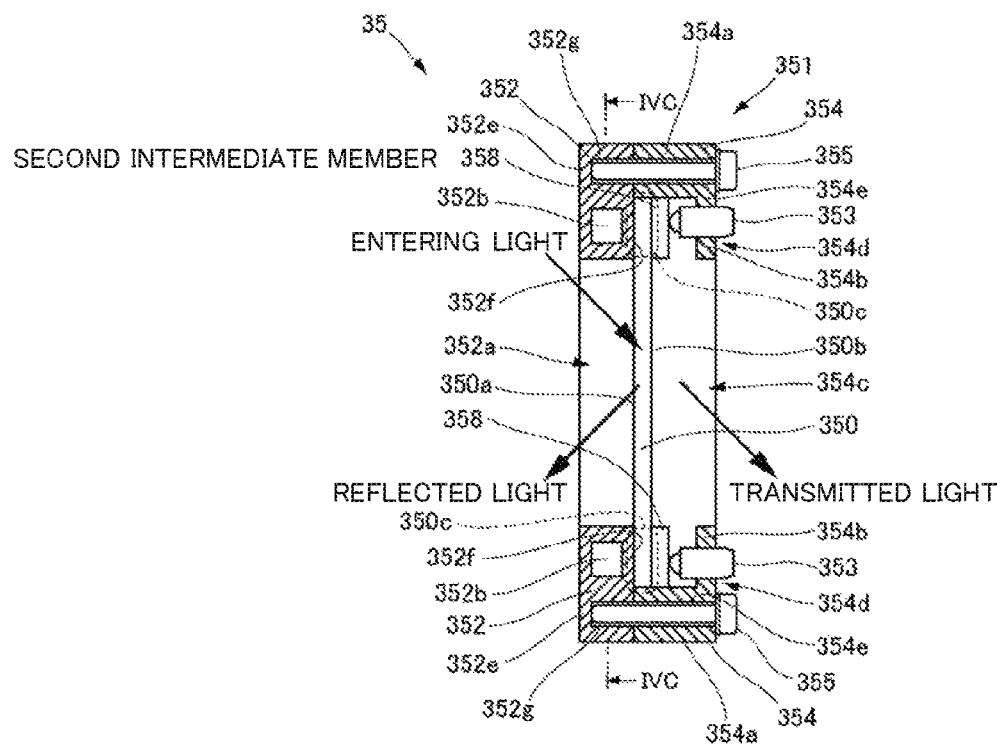
FIG. 6A is a drawing explaining a third example of the mirror device.
Figure 6B:
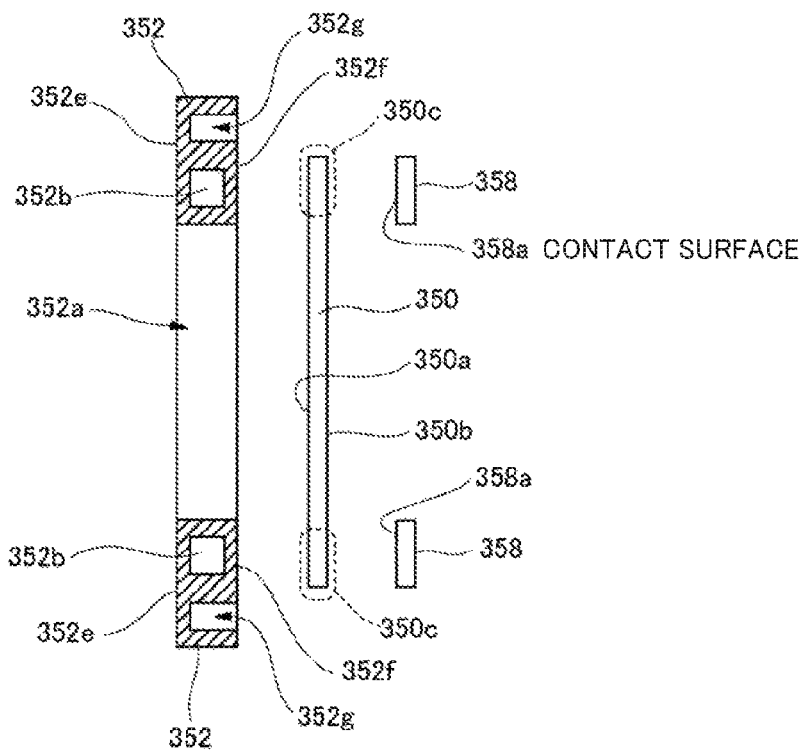
FIG. 6B is a drawing explaining the flatness of each of the support member, a second intermediate member, and the optical element shown in FIG. 6A.

Now, with reference to FIGS. 6A to 7, the third example of the mirror device 35 will be described. FIG. 6A is a drawing explaining the third example of the mirror device 35. FIG. 6B is a drawing explaining the flatness of each of the support member 352, a second intermediate member 358, and the optical element 350 shown in FIG. 6A.

The third example of the mirror device 35 may have a configuration where the second intermediate member 358 is added to the first example of the mirror device 35. The configuration of the third example of the mirror device 35, which is the same as that of the first example of the mirror device 35 shown in FIGS. 4A to 4D, will not be described again here.

The second intermediate member 358 may be configured to be in surface contact with the optical element 350 to push the optical element 350 by the pushing members 353. The second intermediate member 358 may be a plate-like ring provided between the pushing members 353 and the optical element 350. The inside diameter of the ring may be similar to the diameter of the through-hole 354c of the fixing member 354. The outside diameter of the ring may be similar to the diameter of the optical element 350. The second intermediate member 358 may be formed by using a metallic material or a ceramic material. The material for forming the second intermediate member 358 may be the same as the material for forming the first intermediate member 357.

The second intermediate member 358 may be in surface contact with the second surface 350b of the optical element 350. The flatness of a contact surface 358a of the second intermediate member 358 in contact with the optical element 350 may be equal to or smaller than the flatness of the optical element 350. The flatness of the contact surface 358a of the second intermediate member 358 may be equal to or smaller than the flatness of the second surface 350b of the optical element 350. That is, the flatness of the contact surface 358a of the second intermediate member 358 in surface contact with the optical element 350 may be equal to or better than the flatness of the optical element 350.

The pushing members 353 may push the optical element 350 via the second intermediate member 358 in surface contact with the optical element 350. Therefore, even in a case where the pushing members 353 are plunger screws, when the pushing members 353 push the optical element 350 via the second intermediate member 358, a force is applied to the second surface 350b of the optical element 350 from the surface in contact with the second intermediate member 358. Accordingly, the force applied to the optical element 350 when the pushing members 353 push the optical element 350 may not be concentrated on specified points pushed by the pushing members 353, but distributed over the contact surface 358a of the second intermediate member 358. Consequently, the stress generated in the optical element 350 by pushing the optical element 350 by the pushing members 353 may not be easy to be concentrated. Moreover, the flatness of the contact surface 358a of the second intermediate member 358 may be equal to or better than the flatness of the optical element 350. The optical element 350 may be pushed by the pushing members 353 without being subjected to a locally applied force caused by the surface roughness and the irregularity of the contact surface 358a. By this means, according to the third example, even though the optical element 350 is pushed by the pushing members 353, the holder 351 can hold the optical element 350 without distorting the optical element 350. Therefore, the third example of the mirror device 35 can prevent the optical element 350 from being distorted when the optical element 350 held by the holder 351 generates heat.

Figure 7:
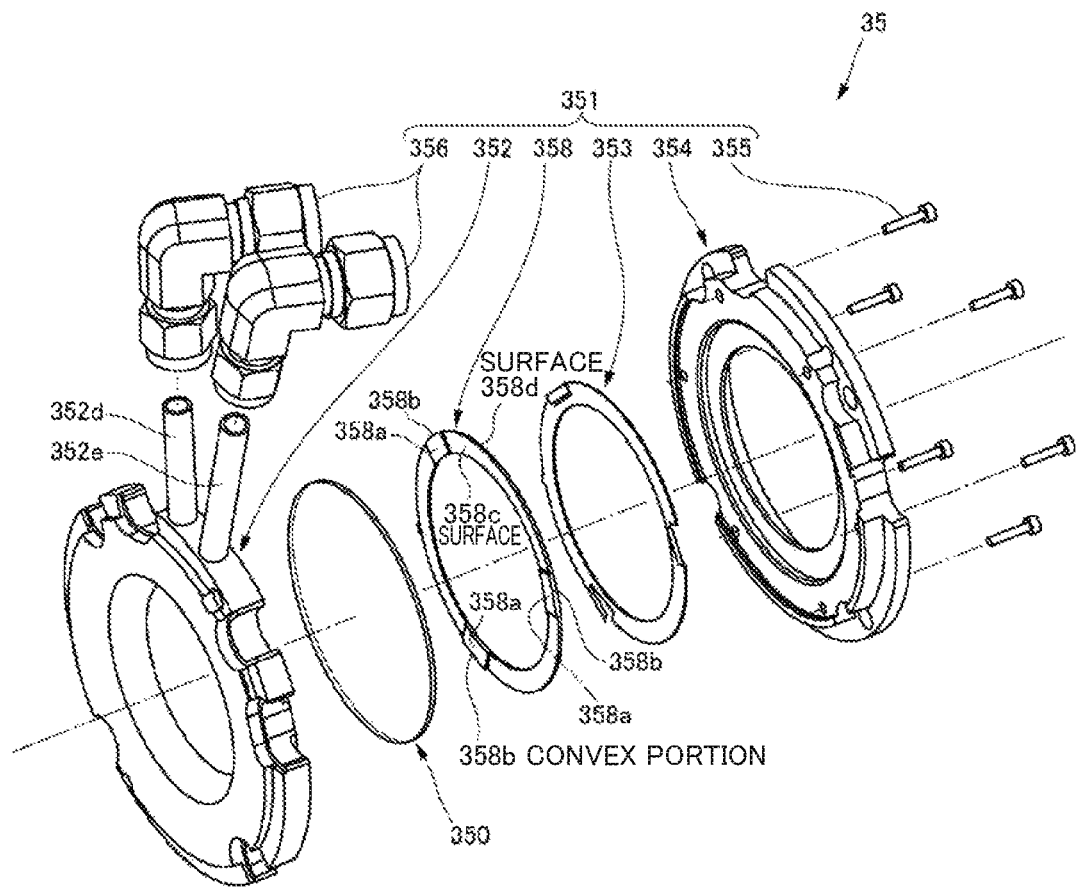
FIG. 7 is a drawing explaining a modification of the third example of the mirror device.

FIG. 7 is a drawing explaining a modification of the third example of the mirror device 35. The structure of the second intermediate member 358 of the modification of the third example of the mirror device 35 may be different from that of the second intermediate member 358 of the third example of the mirror device 35 shown in FIGS. 6A and 6B.

According to the modification of the third example, convex portions 358b may be provided on the second intermediate member 358. The convex portions 358b may be provided on a surface 358c of the second intermediate member 358 in contact with the optical element 350. The positions of the convex portions 358b on the surface 358c of the second intermediate member 358 may correspond to points on a surface 358d of the second intermediate member 358 pushed by the pushing members 353. The top section of each of the convex portions 358b may be flat and constitute the contact surface 358a in contact with the optical element 350. The top sections of the convex portions 358b, which constitute the contact surfaces 358a, may be in surface contact with the second surface 350b of the optical element 350 at the outer edge 350c. The convex portions 358b may be provided on at least three points, which correspond to the points pushed by the pushing members 353, and are symmetric with respect to the center of the ring-shaped second intermediate member 358. When the pushing members 353 are provided on the three points, three convex portions 358b may be provided on the surface 358c of the second intermediate member 358. In addition, according to the modification of the third example, the pushing members 353 may be leaf springs, instead of the plunger screws. With the above-described configuration according to the modification of the third example, the size of the holder 351 may be smaller than that of the holder 351 according to the third example.

The other configuration of the third example of the mirror device 35 may be the same as the configuration of the first example of the mirror device 35 shown in FIGS. 4A to 4D.

5.4 Fourth Example of the Mirror Device

Figure 8:
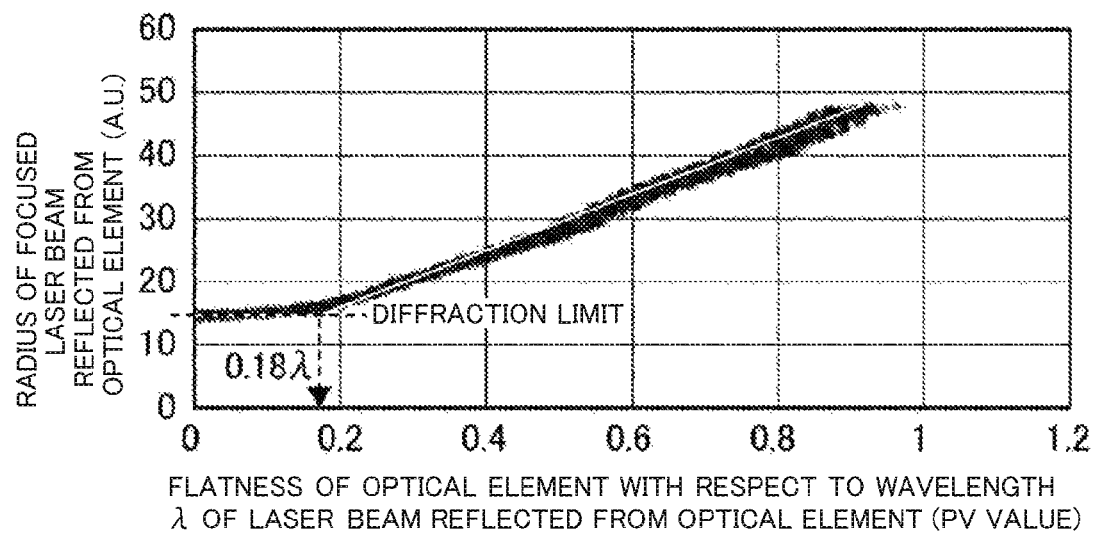
FIG. 8 is a drawing explaining a fourth example of the mirror device.

Now, with reference to FIG. 8, the fourth example of the mirror device 35 will be described. FIG. 8 is a drawing explaining the fourth example of the mirror device 35.

The flatness of the holder 351 of the fourth example of the mirror device 35 may be determined by the wavelength $\lambda$ of the pulsed laser beam 30. FIG. 8 shows a calculated simulation result of the diffraction limit of a laser beam on the reflective surface of an optical element which reflects part of the entering laser beam and transmits the other part of the laser beam therethrough, where the flatness of the reflective surface of the optical element is used as a parameter. In this simulation, the detailed steps for the calculation are as follows. First, making the laser beam which is a plane wave enter the optical element that reflects part of the entering laser beam and transmits the other part of the laser beam therethrough was performed. Next, focusing the laser beam reflected from the reflective surface of the optical element by using a perfect lens was performed. Then, calculating the radius of the reflected laser beam focused onto the focal point of the perfect lens, by using the flatness of the reflective surface of the optical element as a parameter was performed. The flatness of the reflective surface of the optical element is represented as a PV value, and is represented as a relative value with respect to the wavelength $\lambda$ of the reflected laser beam.

The result of the calculation by this simulation is as follows. As shown in FIG. 8, the focal radius of the reflected laser beam may be reduced within a range in which the flatness of the reflective surface of the optical element is smaller than the wavelength $\lambda$ of the reflected laser beam. However, when the flatness of the reflective surface of the optical element is equal to or smaller than $0.18\lambda$, the decrease in the focal radius of the reflected laser beam may be saturated. That is, when the flatness of the reflective surface of the optical element is $0.18\lambda$ ($\approx\lambda/5$), the reflected laser beam from the reflective surface of the optical element may exhibit the diffraction limit. Therefore, if the flatness of the reflective surface of the optical element is equal to or smaller than $0.18\lambda$ ($\approx\lambda/5$), the wavefront of the laser beam reflected from the reflective surface of the optical element may match the wavefront of the laser beam having transmitted through the optical element with high accuracy.

Moreover, when the flatness of the reflective surface of the optical element is equal to or smaller than $0.1\lambda$ ($\approx\lambda/10$), the decrease in the focal radius of the reflected laser beam may be further saturated. Therefore, if the flatness of the reflective surface of the optical element is equal to or smaller than $0.1\lambda$ ($\approx\lambda/10$), the wavefront of the laser beam reflected from the reflective surface of the optical element may match the wavefront of the laser beam having transmitted through the optical element with higher accuracy than when the flatness is $0.18\lambda$ ($\approx\lambda/5$).

Based on the above-described result, the flatness of the optical element 350, as a PV value, may be equal to or smaller than one-fifth of the wavelength $\lambda$ of the pulsed laser beam 30 reflected from the optical element 350. Preferably, the flatness of the optical element 350, as a PV value, may be equal to or smaller than one-tenth of the wavelength $\lambda$ of the pulsed laser beam 30 reflected from the optical element 350. In addition, as described above, the flatness of the contact surface of the holder 351 in contact with the optical element 350 may be equal to or smaller than the flatness of the optical element 350. Therefore, according to the fourth example, the flatness of the contact surface of the holder 351 in contact with the optical element 350 may be equal to or smaller than one-fifth of the wavelength λ of the pulsed laser beam 30 reflected from the optical element 350. Preferably, the flatness of the contact surface of the holder 351 in contact with the optical element 350 may be equal to or smaller than one-tenth of the wavelength λ of the pulsed laser beam 30 reflected from the optical element 350. Therefore, the flatness of the holder 351 of the fourth example of the mirror device 35 may be equal to or smaller than one-fifth, preferably, one-tenth of the wavelength λ of the pulsed laser beam 30.

The other configuration of the fourth example of the mirror device 35 may be the same as the first example of the mirror device 35 shown in FIGS. 4A to 4D.

6. EUV Light Generation Apparatus Including the Mirror Device 6.1 Configuration

Figure 9:
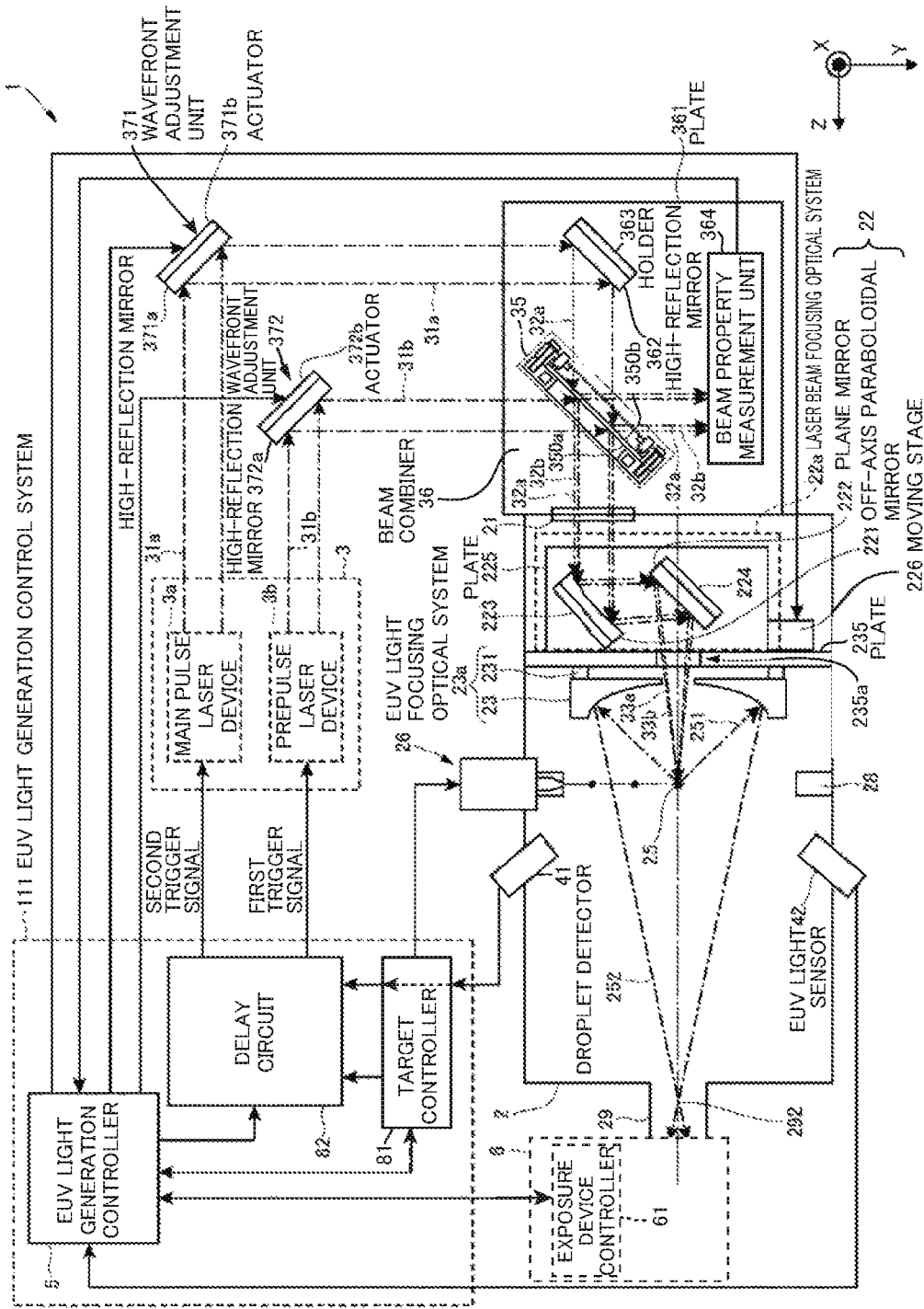
FIG. 9 is a drawing explaining an EUV light generation apparatus including the mirror device.

Now, with reference to FIG. 9, the EUV light generation apparatus 1 including the mirror device 35 will be described. FIG. 9 is a drawing explaining the EUV light generation apparatus 1 including the mirror device 35. In FIG. 9, the direction in which the EUV light 252 is outputted from the chamber 2 of the EUV light generation apparatus 1 to the exposure device 6 is defined as a Z-axis. An X-axis and a Y-axis are orthogonal to the Z-axis and are orthogonal to one another. The configuration of the EUV light generation apparatus 1 shown in FIG. 9, which is the same as that of the EUV light generation apparatus 1 shown in FIG. 1, will not be described again here. The configuration of the laser device 3 shown in FIG. 9, which is the same as that of the laser device 3 shown in FIGS. 2 and 3, will not be described again here. The configuration of the mirror device 35 shown in FIG. 9, which is the same as that of the mirror device 35 shown in FIGS. 4A to 8, will not be described again here.

The laser device 3 used with the EUV light generation apparatus 1 shown in FIG. 9 may include a main pulse laser device 3a and a prepulse laser device 3b. The main pulse laser device 3a may include the laser controller 330, the laser oscillator 301, and the plurality of amplifiers 310, in the same way as the laser device 3 shown in FIG. 2. The wavelength of a laser beam outputted from the main pulse laser device 3a may be, for example, 10.6 μm. Laser beams outputted from the main pulse laser device 3a may be referred to as "main pulse laser beams 31a to 33a" in the same way as the description with reference to FIG. 1. The prepulse laser device 3b may be a solid laser device such as a YAG laser. The wavelength of a laser beam outputted from the prepulse laser device 3b may be, for example, 1.06 μm. Laser beams outputted from the prepulse laser device 3b may be referred to as "prepulse laser beams 31b to 33b" in the same way as the main pulse laser beams 31a to 33a.

The prepulse laser beam may be a pulsed laser beam to be emitted to the target 27 before the main pulse laser beam is emitted to the target 27. Upon being irradiated with the prepulse laser beam, the target 27 may be broken into a plurality of fine particles of the target 27, and dispersed. The dispersed particles of the target 27 may improve the efficiency of generating EUV light by the main pulse laser beam. The dispersed particles of the target 27 resulting from irradiating the target 27 with the prepulse laser beam may be referred to as "secondary target." The other configuration of the laser device 3 shown in FIG. 9 may be the same as the configuration of the laser device 3 shown in FIGS. 2 and 3.

The EUV light generation apparatus 1 shown in FIG. 9 may include the chamber 2, a wavefront adjustment unit 371, a wavefront adjustment unit 372, a beam combiner 36, and an EUV light generation control system 111. The beam combiner 36 may include the mirror device 35, a plate 361, a high-reflection mirror 362, a holder 363, and a beam property measurement unit 364. The EUV light generation control system 111 may include the EUV light generation controller 5, a target controller 81, and a delay circuit 82.

The chamber 2 of the EUV light generation apparatus 1 may be formed into, for example, a hollow spherical shape or a hollow cylindrical shape. The direction of the central axis of the cylindrical chamber 2 may be the same as the direction in which the EUV light 252 is outputted to the exposure device 6.

In the chamber 2, a laser beam focusing optical system 22a, an EUV light focusing optical system 23a, the target collector 28, a plate 225, a plate 235, and a moving stage 226 may be provided.

The plate 235 may be fixed to the inner side surface of the chamber 2. A hole 235a that allows the pulsed laser beam 33 to pass therethrough may be formed at the center of the plate 235 in the thickness direction of the plate 235. The opening direction of the hole 235a may be the same as the direction of the axis passing through the through-hole 24 and the plasma generation region 25 shown in FIG. 1. The EUV light focusing optical system 23a may be provided on one surface of the plate 235. Meanwhile, on the other surface of the plate 235, the plate 225 may be provided via the moving stage 226.

The EUV light focusing optical system 23a provided on the one surface of the plate 235 may include the EUV collector mirror 23 and a holder 231. The holder 231 may hold the EUV collector mirror 23. The holder 231 holding the EUV collector mirror 23 may be fixed to the plate 235.

The plate 225 provided on the other surface of the plate 235 may be changed in its position and posture by the moving stage 226. The moving stage 226 may move the plate 225 in three directions of X, Y, and Z. The moving stage 226 may be connected to the EUV light generation controller 5. The moving stage 226 may move the plate 225 based on the control signal from the EUV light generation controller 5. By this means, the position and the posture of the plate 225 may be changed. The laser beam focusing optical system 22a may be provided on the plate 225.

The laser beam focusing optical system 22a may include the laser beam focusing mirror 22, a holder 223, and a holder 224. The laser beam focusing mirror 22 may include an off-axis paraboloidal mirror 221 and a plane mirror 222.

The holder 223 may hold the off-axis paraboloidal mirror 221. The holder 223 holding the off-axis paraboloidal mirror 221 may be fixed to the plate 225. The holder 224 may hold the plane mirror 222. The holder 224 holding the plane mirror 222 may be fixed to the plate 225.

The off-axis paraboloidal mirror 221 may be placed to face each of the window 21 provided on the bottom surface of the chamber 2 and the plane mirror 222. The plane mirror 222 may be placed to face each of the hole 235a and the off-axis paraboloidal mirror 221. The EUV light generation controller 5 may change the position and posture of the plate 225 via the moving stage 226, so that it is possible to adjust the positions and postures of the off-axis paraboloidal mirror 221 and the plane mirror 222. This adjustment may be performed such that the main pulse laser beam 33a and the prepulse laser beam 33b, which are reflected from the off-axis paraboloidal mirror 221 and the plane mirror 222, are focused onto the plasma generation region 25.

The target collector 28 may be located on the extension of the traveling direction of the target 27 outputted from the target supply part 26 into the chamber 2.

In addition, the target supply part 26, the droplet detector 41, and an EUV light sensor 42 may be provided on the side surface of the chamber 2 shown in FIG. 9. If the chamber 2 is formed into a hollow spherical shape, the target supply part 26, the droplet detector 41, and the EUV light sensor 42 may be provided on a wall surface of the chamber 2 where the window 21 and the connection part 29 are not provided.

The target supply part 26 may heat and melt the solid target 27, and accommodate the molten target 27. The target supply part 26 may form the droplet 271 from the accommodated target 27, and supply the droplet 271 to the plasma generation region 25 in the chamber 2. The direction in which the target supply part 26 outputs the droplet 271 may be orthogonal to the direction in which the EUV light 252 is outputted to the exposure device 6. The target supply part 26 may be connected to the target controller 81. The target supply part 26 may form the droplet 271 and supply the droplet 271 to the plasma generation region 25, based on the control signal from the target controller 81. The target supply part 26 may be placed on a movable stage (not shown). The movable stage may be connected to the target controller 81. The movable stage may move the target supply part 26 such that the droplet 271 outputted into the chamber 2 reaches a targeted position, based on the control signal from the target controller 81.

The droplet detector 41 may detect the droplet 271 outputted into the chamber 2. The droplet detector 41 may detect the droplet 271 passing through a predetermined detection point between the target supply part 26 and the plasma generation region 25. The droplet detector 41 may be connected to the target controller 81. Upon detecting the droplet 271 passing through the detection point, the droplet detector 41 may output a droplet detection signal to the target controller 81. The target controller 81 may determine whether or not the droplet 271 outputted from the target supply part 26 has passed through the detection point.

The EUV light sensor 42 may detect the EUV light 252 reflected from the EUV collector mirror 23. The EUV light sensor 42 may be connected to the EUV light generation controller 5. Upon detecting the EUV light 252 reflected from the EUV collector mirror 23, the EUV light sensor 42 may calculate the optical properties of the EUV light 252, such as the optical intensity and the pulse energy. The EUV light sensor 42 may output a measurement signal related to the optical properties of the EUV light 252 to the EUV light generation controller 5. The EUV light generation controller 5 may determine whether or not the EUV light 252 reflected from the EUV collector mirror 23 has desired optical properties.

The wavefront adjustment unit 371 may adjust the wavefront of the main pulse laser beam 31a. The wavefront adjustment unit 371 may be a VRWM (variable radius wavefront mirror). The wavefront adjustment unit 371 may include a high-reflection mirror 371a and an actuator 371b. The high-reflection mirror 371a may be a deformable mirror. The high-reflection mirror 371a may be disposed to face the main pulse laser device 3a that emits the main pulse laser beam 31a and the high-reflection mirror 362 of the beam combiner 36. The high-reflection mirror 371a may be inclined at an angle of 45 degrees with respect to the axis of the optical path of the main pulse laser beam 31a. The actuator 371b may change the curvature of the high-reflection mirror 371a. The actuator 371b may be disposed on the back side of the high-reflection mirror 371a. The actuator 371b may be connected to the EUV light generation controller 5. The actuator 371b may change the curvature of the high-reflection mirror 371a, based on the control signal from the EUV light generation controller 5. The wavefront of the main pulse laser beam 31a reflected from the high-reflection mirror 371a may be changed in accordance with the curvature of the high-reflection mirror 371a.

The wavefront adjustment unit 372 may adjust the wavefront of the prepulse laser beam 31b. The wavefront adjustment unit 372 may be a VRWM, like the wavefront adjustment unit 371. The wavefront adjustment unit 372 may include a high-reflection mirror 372a and an actuator 372b, like the wavefront adjustment unit 371. The high-reflection mirror 372a may be a deformable mirror. The high-reflection mirror 372a may be disposed to face the prepulse laser device 3b that emits the prepulse laser beam 31b and the mirror device 35 of the beam combiner 36. The high-reflection mirror 372a may be inclined at an angle of 45 degrees with respect to the axis of the optical path of the prepulse laser beam 31b. The actuator 372b may change the curvature of the high-reflection mirror 372a. The actuator 372b may be disposed on the back side of the high-reflection mirror 372a. The actuator 372b may be connected to the EUV light generation controller 5. The actuator 372b may change the curvature of the high-reflection mirror 372a, based on the control signal from the EUV light generation controller 5. The wavefront of the prepulse laser beam 31b reflected from the high-reflection mirror 372a may be changed in accordance with the curvature of the high-reflection mirror 372a. Details of the wavefront adjustment units 371 and 372 will be described later with reference to FIGS. 11A to 13.

The beam combiner 36 may be an optical system configured to introduce the main pulse laser beam 31a and the prepulse laser beam 31b into the chamber 2 along approximately the same optical path axis. As described above, the beam combiner 36 may include the mirror device 35, the plate 361, the high-reflection mirror 362, the holder 363, and the beam property measurement unit 364.

The plate 361 may be fixed to the bottom surface of the chamber 2 on the window 21 side. The holder 363 may hold the high-reflection mirror 362. The holder 363 holding the high-reflection mirror 362 may be fixed to the plate 361 via a tilt stage (not shown). The tilt stage may be connected to the EUV light generation controller 5. The tilt stage may move the holder 363 based on the control signal from the EUV light generation controller 5. By this means, it is possible to change the position and posture of the high-reflection mirror 362 held by the holder 363.

The high-reflection mirror 362 may be disposed to face the window 21 of the chamber 2 and the high-reflection mirror 371a of the wavefront adjustment unit 371. The high-reflection mirror 362 may reflect the main pulse laser beam 31a outputted from the main pulse laser device 3a and reflected from the high-reflection mirror 371a, and guide the reflected main pulse laser beam 31a to the window 21. The main pulse laser beam 32a reflected from the high-reflection mirror 362 may transmit through the mirror device 35 and the window 21, and be introduced into the chamber 2.

The mirror device 35 shown in FIG. 9 may be fixed to the plate 361. The basic configuration of the mirror device 35 shown in FIG. 9 may be the same as that of the mirror device 35 shown in any one of FIGS. 4A to 8.

The optical element 350 of the mirror device 35 may be a dichroic mirror. The optical element 350 may be formed by using a diamond substrate. A reflection coating to highly reflect part of the prepulse laser beam 31b and to transmit part of the main pulse laser beam 31a therethrough may be applied to the first surface 350a of the optical element 350. If the wavelength of the prepulse laser beam 31b is $\lambda p$, the flatness of the first surface 350a of the optical element 350 may be equal to or smaller than one-fifth of λp, preferably, one-tenth of λp. A reflection coating to highly reflect part of the main pulse laser beam 31a and to transmit part of the prepulse laser beam 31b therethrough may be applied to the second surface 350b of the optical element 350. If the wavelength of the main pulse laser beam 31a is λm, the flatness of the second surface 350b of the optical element 350 may be equal to or smaller than one-fifth of λm, preferably, one-tenth of λm.

The mirror device 35 may be disposed such that the optical element 350 is located on the optical path of the prepulse laser beam 31b reflected from the high-reflection mirror 372a of the wavefront adjustment unit 372. At the same time, the mirror device 35 may be disposed such that the optical element 350 is located on the optical path of the main pulse laser beam 32a reflected from the high-reflection mirror 362. The mirror device 35 may be disposed such that the first surface 350a of the optical element 350 faces the window 21 of the chamber 2 and the high-reflection mirror 372a of the wavefront adjustment unit 372. At the same time, the mirror device 35 may be disposed such that the second surface 350b of the optical element 350 faces the beam property measurement unit 364 and the high-reflection mirror 362.

The optical element 350 of the mirror device 35 may reflect part of the prepulse laser beam 31b reflected from the high-reflection mirror 372a of the wavefront adjustment unit 372 and guide the reflected beam to the window 21. At this time, the optical element 350 of the mirror device 35 may transmit part of the prepulse laser beam 31b reflected from the high-reflection mirror 372a of the wavefront adjustment unit 372 therethrough and guide the transmitted beam to the beam property measurement unit 364. The optical element 350 of the mirror device 35 may reflect part of the main pulse laser beam 32a reflected from the high-reflection mirror 362 and guide the reflected beam to the beam property measurement unit 364. At this time, the optical element 350 of the mirror device 35 may transmit part of the main pulse laser beam 32a reflected from the high-reflection mirror 362 therethrough and guide the transmitted beam to the window 21. Here, the optical element 350 of the mirror device 35 may guide the main pulse laser beam 32a and the prepulse laser beam 32b to the window 21 along approximately the same optical path.

The holder 351 of the mirror device 35 may be the same as the holder 351 of the mirror device 35 shown in any of FIGS. 4A to 8. That is, although not shown in FIG. 9, the holder 351 of the mirror device 35 may include the first intermediate member 357 or the second intermediate member 358. The flatness of the contact surface 352f of the support member 352 of the holder 351 may be equal to or smaller than the flatness of the first surface 350a of the optical element 350. That is, the flatness of the contact surface 352f of the support member 352 may be equal to or smaller than one-fifth of λp, preferably, one-tenth of λp. The other configuration of the mirror device 35 shown in FIG. 9 may be the same as that of the mirror device 35 shown in FIGS. 4A to 8.

The beam property measurement unit 364 may measure the beam properties of the main pulse laser beam 32a reflected from the mirror device 35 and the beam properties of the prepulse laser beam 32b having transmitted through the mirror device 35. The beam property measurement unit 364 may include a dichroic mirror (not shown), a plurality of light focusing optical systems (not shown), and a plurality of two-dimensional image sensors (not shown). The dichroic mirror may split the main pulse laser beam 32a reflected from the mirror device 35 and the prepulse laser beam 32b having transmitted through the mirror device 35. The plurality of light focusing optical systems may include a light focusing optical system configured to focus the main pulse laser beam 32a split by the dichroic mirror and a light focusing optical system configured to focus the prepulse laser beam 32b split by the dichroic mirror. The plurality of two-dimensional image sensors may include a two-dimensional image sensor configured to measure the beam properties of the main pulse laser beam 32a focused by the light focusing optical system, and a two-dimensional image sensor configured to measure the beam properties of the prepulse laser beam 32b focused by the light focusing optical system. Each of the plurality of two-dimensional image sensors may be connected to the EUV light generation controller 5. The plurality of two-dimensional image sensors may generate measurement signals related to the measured beam properties of the main pulse laser beam 32a and the prepulse laser beam 32b, and output the signals to the EUV light generation controller 5, respectively. The other configuration of the beam property measurement unit 364 shown in FIG. 9 may be the same as that of the beam property measurement unit $321_k$ shown in FIGS. 2 and 3.

As described above, the EUV light generation control system 111 may include the EUV light generation controller 5, the target controller 81, and the delay circuit 82.

The EUV light generation controller 5 may send/receive various signals to/from an exposure device controller 61 which is the controller of the exposure device 6. For example, the exposure device controller 61 may send an EUV light output command signal to command to output the EUV light 252, to the EUV light generation controller 5. The EUV light output command signal may contain information such as a targeted output timing, a targeted repetition frequency, and a targeted pulse energy of the EUV light 252.

The EUV light generation controller 5 may totally control the whole operation of the EUV light generation system 11, based on various signals sent from the exposure device 6. The EUV light generation controller 5 may send/receive various control signals to/from the actuators of the tilt stage connected to the holder 363 and the moving stage 226. By this means, the EUV light generation controller 5 may adjust the traveling directions of the main pulse laser beams 31a to 33a and the prepulse laser beams 31b to 33b, and the positions on which the main pulse laser beams 31a to 33a and the prepulse laser beams 31b to 33b are focused.

The EUV light generation controller 5 may send/receive various signals to/from the target controller 81. By this means, the EUV light generation controller 5 may control the operations of the target supply part 26 and the droplet detector 41. In particular, the EUV light generation controller 5 may output a target output command signal to command to output the target 27, to the target controller 81, based on the EUV light output command signal outputted from the exposure device controller 61. The target output command signal may contain information such as a targeted output timing, a targeted output frequency, a targeted output position, a targeted velocity, and a targeted diameter of the target 27.

The EUV light generation controller 5 may set a delay time in the delay circuit 82, based on the EUV light output command signal outputted from the exposure device controller 61. By this means, the EUV light generation controller 5 may control the timings at which the main pulse laser device 3a and the prepulse laser device 3b oscillate.

The EUV light generation controller 5 may control the operation of the wavefront adjustment unit 371, based on the measurement signal related to the beam properties of the main pulse laser beam 32a outputted from the beam property measurement unit 364. By this means, the EUV light generation controller 5 may adjust the wavefront of the main pulse laser beam 31a reflected from the high-reflection mirror 371a to a desired wavefront. The EUV light generation controller 5 may control the operation of the wavefront adjustment unit 372, based on the measurement signal related to the beam properties of the prepulse laser beam 32b outputted from the beam property measurement unit 364. By this means, the EUV light generation controller 5 may adjust the wavefront of the prepulse laser beam 31b reflected from the high-reflection mirror 372a to a desired wavefront. The EUV light generation controller 5 may control the operation of each of the components of the EUV light generation system 11, based on the measurement signal related to the optical properties of the EUV light 252 outputted from the EUV light sensor 42. Here, the hardware configuration of the EUV light generation controller 5 will be described later with reference to FIG. 10.

The target controller 81 may control the output timing, the output frequency, the output position, the velocity, the diameter and so forth of the droplet 271 when the droplet 271 is outputted from the target supply part 26, based on the target output command signal outputted from the EUV light generation controller 5. The target controller 81 may be connected to the laser device 3 via the delay circuit 82. The target controller 81 may output the droplet detection signal outputted from the droplet detector 41 directly to the delay circuit 82. Here, the hardware configuration of the target controller 81 will be described later with reference to FIG. 10.

The delay circuit 82 may output a trigger signal to the laser device 3 at a timing delayed by a predetermined delay time from when the droplet detection signal is outputted. The trigger signal outputted from the delay circuit 82 may be a signal to trigger the laser oscillation of the laser device 3 to output the pulsed laser beam 31.

The trigger signal outputted from the delay circuit 82 may include a first trigger signal and a second trigger signal. The first trigger signal may be a signal to trigger the prepulse laser device 3b to output the prepulse laser beam 31b. The second trigger signal may be a signal to trigger the main pulse laser device 3a to output the main pulse laser beam 31a. The predetermined delay time set by the EUV light generation controller 5 may include a first delay time and a second delay time. The first delay time may determine the timing at which the first trigger signal is outputted to the prepulse laser device 3b. The first delay time may correspond to a period of time from when the droplet 271 passes through the above-described detection point until the droplet 271 reaches the plasma generation region 25. The second delay time may determine the timing at which the second trigger signal is outputted to the main pulse laser device 3a after the first trigger signal is outputted. The second delay time may correspond to a period of time from when the droplet 271 reaching the plasma generation region 25 is irradiated with the prepulse laser beam 33b until the droplet 271 is dispersed and turned into a secondary target. By this means, when the droplet 271 having passed through the above-described detection point between the target supply part 26 and the plasma generation region 25 reaches the plasma generation region 25, the droplet 271 may be irradiated with the prepulse laser beam 33b. Then, the secondary target generated by the irradiation with the prepulse laser beam 33b may be irradiated with the main pulse laser beam 33a.

The other configuration of the EUV light generation apparatus 1 shown in FIG. 9 may be the same as that of the EUV light generation apparatus 1 shown in FIG. 1.

6.2 Operation

After activating the EUV light generation apparatus 1, the EUV light generation controller 5 may set the first delay time and the second delay time in the delay circuit 82. By this means, it is possible to set the timing at which the droplet 271 reaching the plasma generation region 25 is irradiated with the prepulse laser beam 33b, and the timing at which the secondary target is irradiated with the main pulse laser beam 33a. The EUV light generation controller 5 may receive the EUV light output command signal sent from the exposure device 6. The EUV light generation controller 5 may output the target output command signal to the target controller 81, based on the EUV light output command signal.

The target controller 81 may control the operation of each of the components of the target supply part 26, based on the target output command signal. The target supply part 26 may output the droplet 271 which satisfies various targeted values contained in the target output command signal, into the chamber 2, according to the control from the target controller 81. When the droplet 271 passes through the above-described detection point in the chamber 2, the droplet detector 41 may output the droplet detection signal, and the droplet detection signal may be inputted to the delay circuit 82 via the target controller 81.

The delay circuit 82 may output the first trigger signal to the prepulse laser device 3b at a timing which is delayed by the first delay time from when the droplet detection signal is outputted. Upon receiving the first trigger signal, the prepulse laser device 3b may output the prepulse laser beam 31b. The prepulse laser beam 31b may travel through the wavefront adjustment unit 372, the mirror device 35, and the laser beam focusing optical system 22a in this order, and be focused onto the plasma generation region 25 as the prepulse laser beam 33b. The droplet 271 may be irradiated with the prepulse laser beam 33b in synchronization with the timing at which the droplet 271 reaches the plasma generation region 25. The droplet 271 irradiated with the prepulse laser beam 33b may be broken and dispersed, and therefore turned into the secondary target.

The delay circuit 82 may output the second trigger signal to the main pulse laser device 3a at a timing which is delayed by the second delay time from when the first trigger signal is outputted. Upon receiving the second trigger signal, the main pulse laser device 3a may output the main pulse laser beam 31a. The main pulse laser beam 31a may travel through the wavefront adjustment unit 371, the high-reflection mirror 362, the mirror device 35, and the laser beam focusing optical system 22a in this order, and be focused onto the plasma generation region 25 as the main pulse laser beam 33a. The secondary target may be irradiated with the main pulse laser beam 33a in synchronization with the timing at which the secondary target is generated in the plasma generation region 25. The secondary target irradiated with the main pulse laser beam 33a may be turned into plasma and emit light containing the EUV light 251.

When the main pulse laser beam 31a and the prepulse laser beam 31b enter the mirror device 35, the optical element 350 of the mirror device 35 held by the holder 351 may generate heat due to the absorption of the main pulse laser beam 31a and the prepulse laser beam 31b. The heat generated in the optical element 350 may be transferred to the support member 352 in surface contact with the optical element 350. The heat transferred to the support member 352 may be transferred to the refrigerant circulating through the flow channel 352b, and discharged to the outside of the mirror device 35. The holder 351 may hold the optical element 350 by applying a force uniformly to the optical element 350 without restricting the thermal expansion and shrinkage of the optical element 350. In addition, the holder 351 may hold the optical element 350 thermally expanding and shrinking, without locally applying a force caused by the surface roughness and the irregularity of the contact surface 352f. Moreover, the holder 351 may reduce a change in the volume of the optical element 350 due to the thermal expansion. Therefore, it is possible to prevent the optical element 350 from being distorted due to the heat generated in the optical element 350 held in the holder 351. By this means, the wavefront of the prepulse laser beam 32b reflected from the optical element 350 may match the wavefront of the prepulse laser beam 32b having transmitted through the optical element 350. The wavefront of the main pulse laser beam 32a reflected from the optical element 350 may match the wavefront of the main pulse laser beam 32a having transmitted through the optical element 350.

The main pulse laser beam 32a reflected from the optical element 350 and the prepulse laser beam 32b having transmitted through the optical element 350 may enter the beam property measurement unit 364. The beam property measurement unit 364 may measure the beam properties, including the beam divergence, of the received main pulse laser beam 32a and prepulse laser beam 32b. The beam property measurement unit 364 may generate measurement signals related to the measured beam properties of the main pulse laser beam 32a and the prepulse laser beam 32b, and output the signals to the EUV light generation controller 5.

The EUV light generation controller 5 may control the operations of the wavefront adjustment unit 371 and the wavefront adjustment unit 372, based on the measurement signals related to the beam properties of the main pulse laser beam 32a and the prepulse laser beam 32b, which are outputted from the beam property measurement unit 364. By this means, the EUV light generation controller 5 may adjust the wavefront of each of the main pulse laser beam 31a and the prepulse laser beam 31b to a desired wavefront.

6.3 Effect

The EUV light generation apparatus 1 including the mirror device 35 can match the axis of the optical path of the main pulse laser beam 32a to the axis of the optical path of the prepulse laser beam 32b. The EUV light generation apparatus 1 including the mirror device 35 can prevent the optical element 350 held by the holder 351 from being distorted when the optical element 350 generates heat. The EUV light generation apparatus 1 including the mirror device 35 can prevent the wavefront of each of the main pulse laser beam 32a and the prepulse laser beam 32b reflected from the optical element 350, from being changed due to the distortion of the optical element 350. Therefore, the EUV light generation apparatus 1 including the mirror device 35 can focus the main pulse laser beam 33a and the prepulse laser beam 33b having the desired beam properties onto the plasma generation region 25. By this means, the EUV light generation apparatus 1 including the mirror device 35 can generate the stable EUV light 252.

7. Others 7.1 Hardware Environment of Each Controller

A person skilled in the art would understand that the subject matters disclosed herein can be implemented by combining a general purpose computer or a programmable controller with a program module or a software application. In general, the program module includes routines, programs, components and data structures which can execute the processes disclosed herein.

Figure 10:
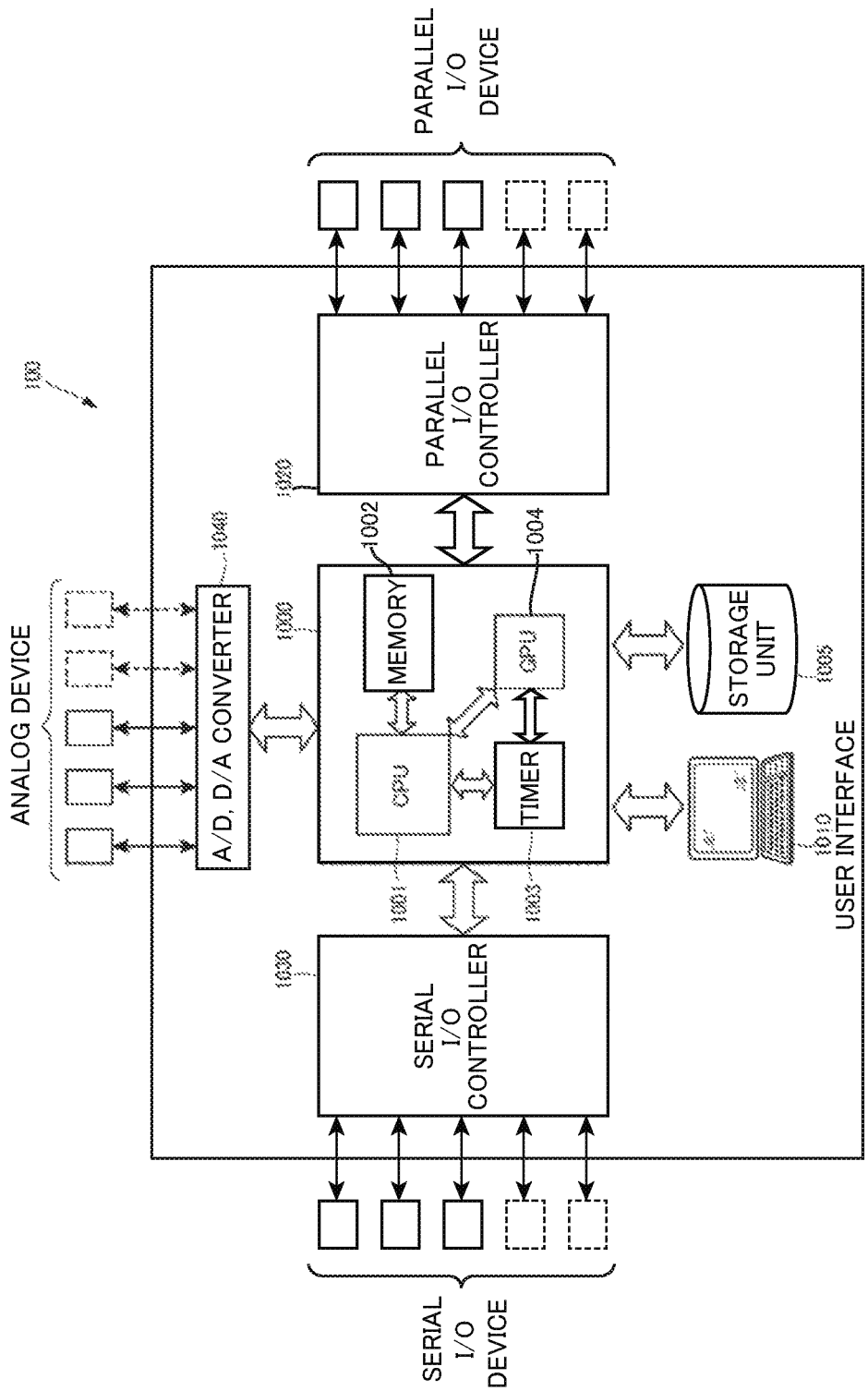
FIG. 10 is a block diagram showing a hardware environment of each of the controllers.

FIG. 10 is a block diagram showing an exemplary hardware environment in which various aspects of the subject matters disclosed herein can be implemented. An exemplary hardware environment 100 shown in FIG. 10 may include a processing unit 1000, a storage unit 1005, a user interface 1010, a parallel I/O controller 1020, a serial I/O controller 1030, and an A/D, D/A converter 1040, but the configuration of the hardware environment 100 is not limited to this.

The processing unit 1000 may include a central processing unit (CPU) 1001, a memory 1002, a timer 1003, and a graphics processing unit (GPU) 1004. The memory 1002 may include a random access memory (RAM) and a read only memory (ROM). The CPU 1001 may be any of commercially available processors. A dual microprocessor or another multiprocessor architecture may be used as the CPU 1001.

The components shown in FIG. 10 may be interconnected with each other to perform the processes described herein.

During its operation, the processing unit 1000 may read and execute a program stored in the storage unit 1005, read data together with the program from the storage unit 1005, and write data to the storage unit 1005. The CPU 1001 may execute a program read from the storage unit 1005. The memory 1002 may be a work area in which a program executed by the CPU 1001 and data used in the operation of the CPU 1001 are temporarily stored. The timer 1003 may measure a time interval and output the result of the measurement to the CPU 1001 according to the execution of the program. The GPU 1004 may process image data according to a program read from the storage unit 1005, and output the result of the process to the CPU 1001.

The parallel I/O controller 1020 may be connected to parallel I/O devices that can communicate with the processing unit 1000, such as the exposure device controller 61, the EUV light generation controller 5, the controller 323, the laser controller 330, the two-dimensional image sensor 321c, the two-dimensional image sensors for the beam property measurement unit 364, the target controller 81, and the delay circuit 82. The parallel I/O controller 1020 may control the communication between the processing unit 1000 and those parallel I/O devices. The serial I/O controller 1030 may be connected to serial I/O devices that can communicate with the processing unit 1000, such as the actuator 371b, the actuator 372b, the moving stage 226, the target supply part 26, the water pressure adjustment unit, and the pulse motor. The serial I/O controller 1030 may control the communication between the processing unit 1000 and those serial I/O devices. The A/D, D/A converter 1040 may be connected to analog devices such as the temperature sensor, the pressure sensor, the voltage sensor, various sensors for a vacuum gauge, the target sensor 4, the droplet detector 41 and the EUV light sensor 42 via analog ports, may control the communication between the processing unit 1000 and those analog devices, and may perform A/D, D/A conversion of the contents of the communication.

The user interface 1010 may present the progress of the program executed by the processing unit 1000 to an operator, in order to allow the operator to command the processing unit 1000 to stop the program and to execute an interruption routine.

The exemplary hardware environment 100 may be applicable to the exposure device controller 61, the EUV light generation controller 5, the controller 323, the laser controller 330, and the target controller 81 in the present disclosure. A person skilled in the art would understand that those controllers may be realized in a distributed computing environment, that is, an environment in which tasks are performed by the processing units connected to each other via a communication network. In this disclosure, the exposure device controller 61, the EUV light generation controller 5, the controller 323, the laser controller 330, and the target controller 81 may be connected to each other via a communication network such as Ethernet or Internet. In the distributed computing environment, the program module may be stored in both of a local memory storage device and a remote memory storage device.

7.2 Wavefront Adjustment Unit

Figure 11A:
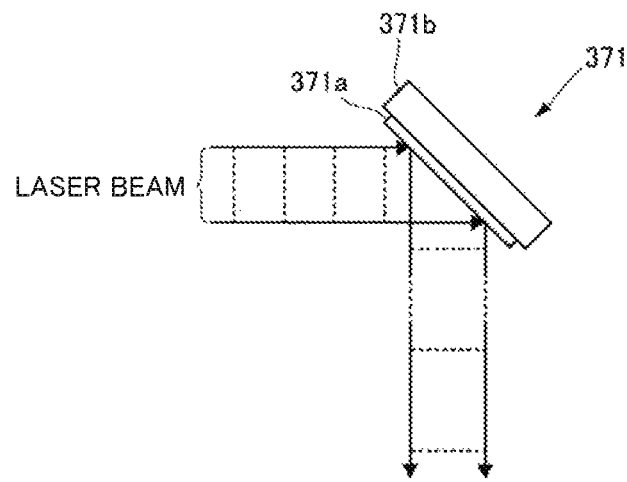
FIG. 11A is a drawing explaining the configuration of a wavefront adjustment unit, where a laser beam entering the wavefront adjustment unit is a plane wave.

With reference to FIGS. 11A to 13, the configuration of the wavefront adjustment units 371 and 372 will be described. The wavefront adjustment units 371 and 372 may have the same configuration, and therefore the wavefront adjustment unit 371 will be described as an example. FIG. 11A is a drawing explaining the configuration of the wavefront adjustment unit 371, where the laser beam entering the wavefront adjustment unit 371 is a plane wave. FIG. 11B is a drawing explaining the configuration of the wavefront adjustment unit 371, where the laser beam entering the wavefront adjustment unit 371 is a convex wave. FIG. 11C is a drawing explaining the configuration of the wavefront adjustment unit 371, where the laser beam entering the wavefront adjustment unit 371 is a concave wave.

As described above, the wavefront adjustment unit 371 may be a VRWM. The VRWM may be an element configured to transform a plane wave into a concave wave or a convex wave having a curved wavefront. To the contrary, the VRWM may transform a concave wave or a convex wave having a curved wavefront into a plane wave. In addition, the VRWM may be an element configured to adjust the curvature of the wavefront of a concave wave or a convex wave to a different curvature. As described above, the wavefront adjustment unit 371 may include the high-reflection mirror 371a, and the actuator 371b configured to change the curvature of the high-reflection mirror 371a.

When the laser beam entering the wavefront adjustment unit 371 is a plane wave, the actuator 371b may adjust the curvature of the high-reflection mirror 371a to maintain the reflective surface of the high-reflection mirror 371a to be a flat surface. Meanwhile, when the laser beam entering the wavefront adjustment unit 371 is a convex wave, the actuator 371b may adjust the curvature of the high-reflection mirror 371a such that the reflective surface of the high-reflection mirror 371a becomes a concave surface. When the laser beam entering the wavefront adjustment unit 371 is a concave wave, the actuator 371b may adjust the curvature of the high-reflection mirror 371a such that the reflective surface of the high-reflection mirror 371a becomes a convex surface. By this means, the laser beam reflected from the high-reflection mirror 371a shown in FIGS. 11A to 11C may become a plane wave.

Figure 11B:
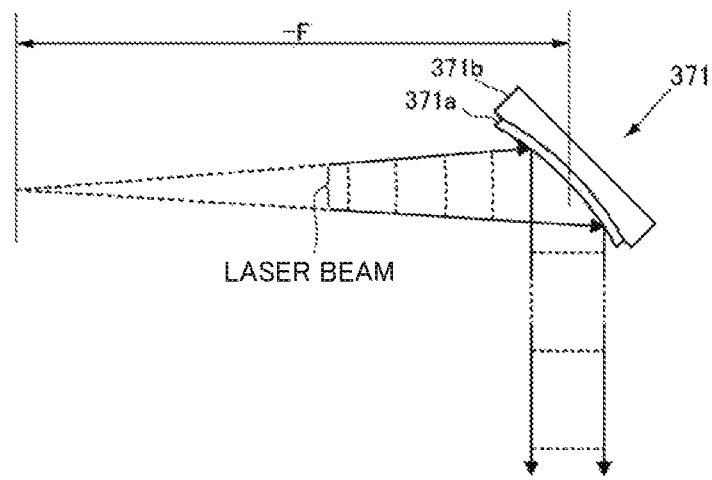
FIG. 11B is a drawing explaining the configuration of the wavefront adjustment unit, where a laser beam entering the wavefront adjustment unit is a convex wave.
Figure 11C:
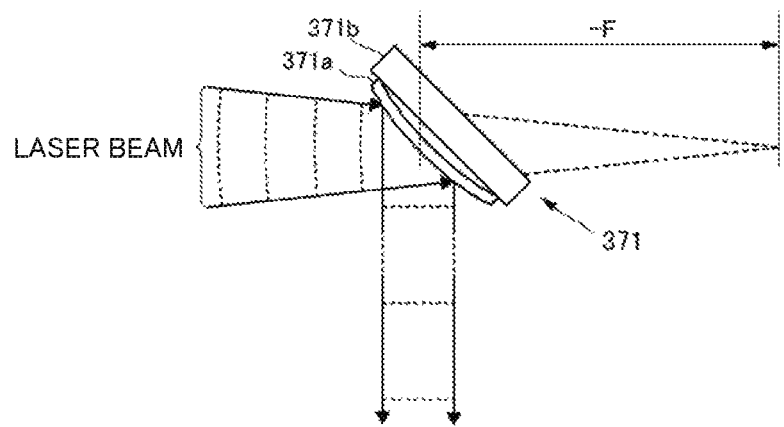
FIG. 11C is a drawing explaining the configuration of the wavefront adjustment unit, where a laser beam entering the wavefront adjustment unit is a concave wave.
Figure 12:
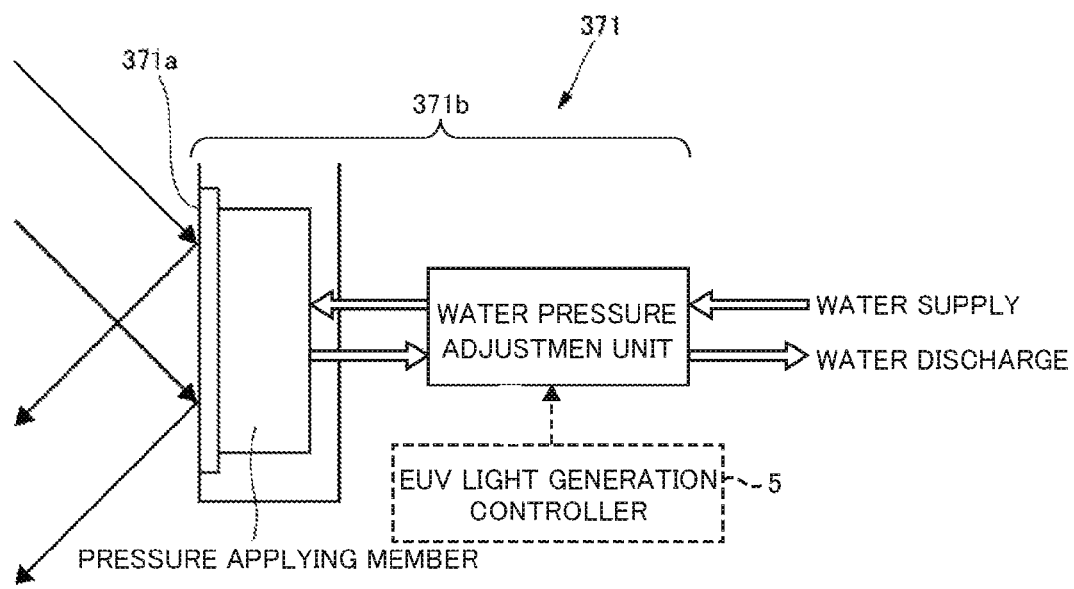
FIG. 12 is a drawing explaining an actuator of the wavefront adjustment unit shown in FIGS. 11A to 11C.

FIG. 12 is a drawing explaining the actuator 371b of the wavefront adjustment unit 371 shown in FIGS. 11A to 11C. The actuator 371b may include a pressure applying member and a water pressure adjustment unit. The pressure applying member may apply pressure to the high-reflection mirror 371a from the back side of the high-reflection mirror 371a, depending on the water pressure supplied from the water pressure adjustment unit. The water pressure adjustment unit may regulate the water pressure supplied to the pressure applying member. The water pressure adjustment unit may regulate the water pressure supplied to the pressure applying member to adjust the amount of the pressure applied to the high-reflection mirror 371a, based on the control signal from the EUV light generation controller 5. By this means, the actuator 371b shown in FIG. 12 may change the curvature of the high-reflection mirror 371a.

Figure 13:
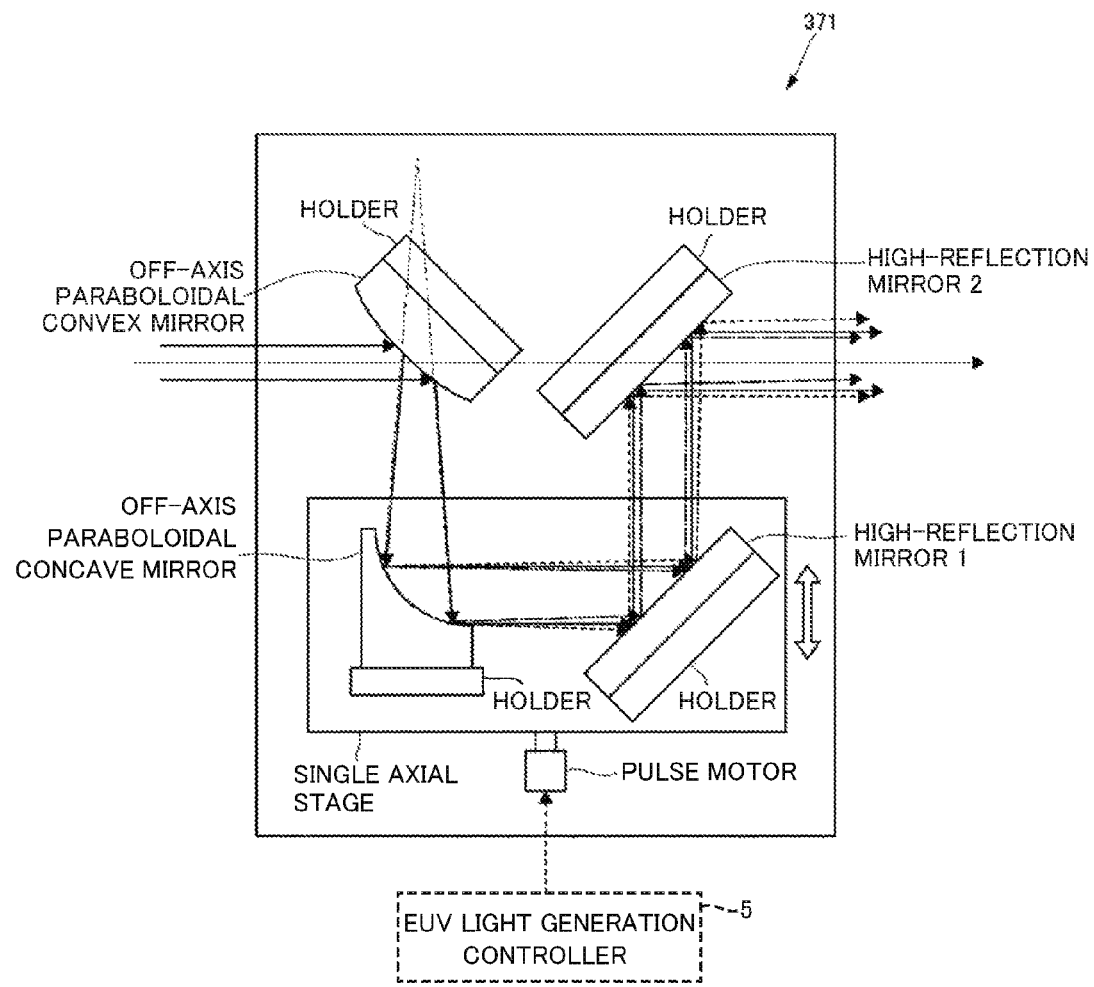
FIG. 13 is a drawing explaining another example of the configuration of the wavefront adjustment unit.

With reference to FIG. 13, another example of the configuration of the wavefront adjustment unit 371 will be described. FIG. 13 is a drawing explaining another example of the configuration of the wavefront adjustment unit 371. The wavefront adjustment unit 371 may include an off-axis paraboloidal convex mirror, an off-axis paraboloidal concave mirror, a high-reflection mirror 1, a high-reflection mirror 2, a single axis stage, a pulse motor, and holders. The off-axis paraboloidal convex mirror, the off-axis paraboloidal concave mirror, the high-reflection mirror 1, and the high-reflection mirror 2 may be held by the holders, respectively. A flow channel (not shown) through which the refrigerant flows may be provided in each of the holders.

The off-axis paraboloidal convex mirror, the off-axis paraboloidal concave mirror, the high-reflection mirror 1, and the high-reflection mirror 2 may be disposed to be inclined at 45 degrees with respect to the axes of the optical paths of the laser beams entering the off-axis paraboloidal convex mirror, the off-axis paraboloidal concave mirror, the high-reflection mirror 1, and the high-reflection mirror 2, respectively. The off-axis paraboloidal convex mirror and the off-axis paraboloidal concave mirror are disposed such that their focusing points match with one another. The off-axis paraboloidal convex mirror may enlarge the diameter of the laser beam having entered the wavefront adjustment unit 371. The off-axis paraboloidal concave mirror may collimate the laser beam enlarged by the off-axis paraboloidal convex mirror. The high-reflection mirrors 1 and 2 may change the axis of the optical path of the laser beam collimated by the off-axis paraboloidal concave mirror to the extension of the axis of the optical path of the laser beam entering the off-axis paraboloidal convex mirror. By this means, the wavefront adjustment unit 371 shown in FIG. 13 may match the axis of the optical path of the laser beam exiting the wavefront adjustment unit 371 to the axis of the optical path of the laser beam entering the wavefront adjustment unit 371.

The off-axis paraboloidal concave mirror and the high-reflection mirror 1 may be placed on the single axis stage. The single axis stage may be driven by the pulse motor, and change the distance between the off-axis paraboloidal concave mirror and the off-axis paraboloidal convex mirror, and the distance between the high-reflection mirror 1 and the high-reflection mirror 2. The pulse motor may adjust the amount of the movement of the single axis stage, based on the control signal from the EUV light generation controller 5. If the distance between the off-axis paraboloidal concave mirror and the off-axis paraboloidal convex mirror, that is, the distance between the high-reflection mirror 1 and the high-reflection mirror 2 is changed, the wavefront of the laser beam exiting the wavefront adjustment unit 371 may be changed with respect to the wavefront of the laser beam entering the wavefront adjustment unit 371. By this means, the wavefront adjustment unit 371 shown in FIG. 13 may adjust the wavefront of the laser beam entering the wavefront adjustment unit 371.

All the optical elements included in the wavefront adjustment unit 371 shown in FIG. 13 may be reflective optical elements, and held by the holders each including a flow channel through which the refrigerant flows. Therefore, even when receiving a high-power laser beam of, for example, 5 kW to 40 kW, the wavefront adjustment unit 371 may stably adjust the wavefront of the laser beam. Here, the off-axis paraboloidal concave mirror of the wavefront adjustment unit 371 shown in FIG. 13 may be replaced with the high-reflection mirror 1 or the high-reflection mirror 2, if the focusing point of the off-axis paraboloidal concave mirror matches the focusing point of the off-axis paraboloidal convex mirror. The wavefront adjustment unit 371 shown in FIG. 13 may employ two off-axis paraboloidal concave mirrors, instead of the off-axis paraboloidal convex mirror and the off-axis paraboloidal concave mirror.

7.3 Modification

It would be obvious to a person skilled in the art that the technologies described in the above-described embodiments including the modifications may be compatible with each other.

The descriptions above are intended to be illustrative only and the present disclosure is not limited thereto. Therefore, it will be apparent to those skilled in the art that it is possible to make modifications to the embodiments of the present disclosure within the scope of the appended The terms used this specification and the appended claims should be interpreted as "non-limiting." For example, the terms "include" and "be included" should be interpreted as "including the stated elements but not limited to the stated elements," The term "have" should be interpreted as "having the stated elements but not limited to the stated elements." Further, the indefinite art "a/an" should be interpreted as "at least one" or "one or more."

REFERENCE SIGNS LIST

1 EUV light generation apparatus
27 target
301 laser oscillator
310 amplifier
35 mirror device
350 optical element
350a first surface
350b second surface
351 holder
352 support member
352b flow channel
352f contact surface
353 pushing member
357 first intermediate member
357a contact surface
358 second intermediate member

The invention claimed is:

1. A mirror device comprising:
an optical element configured to reflect part of a laser beam and transmit the other part of the laser beam therethrough; and
a holder in surface contact with the optical element to hold the optical element,
wherein a flatness of a contact surface of the holder in contact with a first surface of the optical element is equal to or smaller than a flatness of the first surface of the optical element, and
wherein the holder includes:
a support member having the contact surface in surface contact with the first surface of the optical element to support the optical element; and
a pushing member configured to push the optical element against the support member by pushing a second surface of the optical element.

2. The mirror device according to claim 1, wherein:
the holder further includes a first intermediate member disposed between the support member and the first surface, the first intermediate member being in surface contact with the support member and the first surface; and
a flatness of a contact surface of the first intermediate member in contact with the first surface is equal to or smaller than the flatness of the first surface.

3. The mirror device according to claim 2, wherein a flatness of a contact surface of the first intermediate member in contact with the support member is equal to or smaller than the flatness of the first surface.

4. The mirror device according to claim 1, wherein:
the holder further includes a second intermediate member disposed between the pushing member and the second surface, the second intermediate member being in surface contact with the second surface; and
the pushing member pushes the second surface via the second intermediate member.

5. The mirror device according to claim 1, wherein a flow channel through which a refrigerant flows is provided in the support member.

6. The mirror device according to claim 1, wherein the pushing member pushes at least three points of the second surface.

7. The mirror device according to claim 1, wherein the laser beam is emitted from an amplifier that amplifies a seed beam, or a laser oscillator.

8. The mirror device according to claim 1, wherein the laser beam is emitted to a target, so that the target is turned into plasma to generate extreme ultraviolet light.

9. A mirror device comprising:
an optical element configured to reflect part of a laser beam and transmit the other part of the laser beam therethrough; and
a holder in surface contact with the optical element to hold the optical element,
wherein, when a wavelength of the laser beam reflected from a surface of the optical element is $\lambda$, a flatness of a contact surface of the holder in contact with the optical element is equal to or smaller than one-fifth of $\lambda$.

* * * * *